(12) United States Patent
Morioka

(10) Patent No.: US 9,900,909 B2
(45) Date of Patent: Feb. 20, 2018

(54) COMMUNICATIONS SYSTEM FOR TRANSMITTING AND RECEIVING DATA

(71) Applicant: SONY CORPORATION, Tokyo (JP)

(72) Inventor: Yuichi Morioka, Reading (GB)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 14/784,790

(22) PCT Filed: Apr. 15, 2014

(86) PCT No.: PCT/GB2014/051183
§ 371 (c)(1),
(2) Date: Oct. 15, 2015

(87) PCT Pub. No.: WO2014/174250
PCT Pub. Date: Oct. 30, 2014

(65) Prior Publication Data
US 2016/0081117 A1 Mar. 17, 2016

(30) Foreign Application Priority Data

Apr. 22, 2013 (GB) .................................. 1307187.3

(51) Int. Cl.
*H04W 74/00* (2009.01)
*H04W 72/04* (2009.01)
(Continued)

(52) U.S. Cl.
CPC ..... *H04W 74/006* (2013.01); *H04W 52/0216* (2013.01); *H04W 52/0229* (2013.01);
(Continued)

(58) Field of Classification Search
CPC ... H04W 72/04; H04W 52/02; H04W 74/006; H04W 74/04; H04W 74/0833; H04W 76/046; H04W 74/08; Y02B 60/50
See application file for complete search history.

(56) References Cited

U.S. PATENT DOCUMENTS 7,508,781 B2 * 3/2009 Liu ................... H04W 52/0216
370/311
2002/0109621 A1 * 8/2002 Khair ................... A61B 5/0006
341/174
(Continued)

FOREIGN PATENT DOCUMENTS

EP 2 475 214 A1 7/2012
JP 2002-202834 A 7/2002
(Continued)

OTHER PUBLICATIONS

U.S. Appl. No. 14/781,509, filed Sep. 30, 2015, Yuichi Morioka.
(Continued)

*Primary Examiner* — Jenee Holland
(74) *Attorney, Agent, or Firm* — Oblon, McClelland, Maier & Neustadt, L.L.P.

(57) ABSTRACT

A communications system including infrastructure equipment providing a wireless interface to a communications device including a controller and a transceiver configured to transmit/receive signals representing the data to/from the infrastructure equipment over the wireless interface. The transceiver can transmit a request for services message to the infrastructure equipment, and receive a response message. The request for services message includes a delay period and the infrastructure equipment, in response to receiving the request for services message, processes the request to form the response message and stores the response message for transmission to the communications device. The response message is stored until expiry of the delay period or transmission of the response message, and the controller after transmission of the request for services can configure the transceiver to enter a reduced power state and to exit the reduced power state to receive the response message.

15 Claims, 15 Drawing Sheets

(51) Int. Cl.
*H04W 52/02* (2009.01)
*H04W 76/04* (2009.01)
*H04W 74/08* (2009.01)

(52) U.S. Cl.
CPC ..... *H04W 72/0446* (2013.01); *H04W 74/004* (2013.01); *H04W 74/08* (2013.01); *H04W 76/046* (2013.01); *H04W 72/04* (2013.01); *H04W 74/0833* (2013.01); *Y02B 60/50* (2013.01)

(56) References Cited

U.S. PATENT DOCUMENTS

| | | | | |
|---|---|---|---|---|
| 2003/0215243 | A1* | 11/2003 | Booth | H04B 10/806 398/135 |
| 2004/0106430 | A1* | 6/2004 | Schwarz | H04W 28/18 455/552.1 |
| 2004/0264397 | A1* | 12/2004 | Benveniste | H04L 12/12 370/311 |
| 2005/0047429 | A1* | 3/2005 | Koo | H04W 74/02 370/447 |
| 2005/0170868 | A1* | 8/2005 | Fischer | H04L 12/12 455/574 |
| 2005/0197171 | A1* | 9/2005 | Son | H04W 52/28 455/574 |
| 2006/0112287 | A1* | 5/2006 | Paljug | G06F 1/3209 713/300 |
| 2006/0182056 | A1* | 8/2006 | Kim | H04W 52/0229 370/328 |
| 2007/0086367 | A1* | 4/2007 | Sung | H04L 1/1874 370/278 |
| 2007/0143637 | A1* | 6/2007 | Tsai, Jr. | G06F 1/3215 713/300 |
| 2007/0287476 | A1* | 12/2007 | Jeong | H04W 76/02 455/456.6 |
| 2008/0220819 | A1* | 9/2008 | Ben-Eli | H04B 7/0874 455/561 |
| 2008/0246888 | A1* | 10/2008 | Oh | H04N 5/4401 348/730 |
| 2009/0212938 | A1* | 8/2009 | Swaim | G01R 1/06788 340/539.1 |
| 2009/0282277 | A1* | 11/2009 | Sedarat | G06F 1/3209 713/320 |
| 2009/0312004 | A1 | 12/2009 | Farnsworth et al. | |
| 2010/0142426 | A1* | 6/2010 | Taniuchi | H04W 52/028 370/311 |
| 2010/0238872 | A1 | 9/2010 | Kim et al. | |
| 2011/0164587 | A1* | 7/2011 | Seo | |
| 2011/0176463 | A1* | 7/2011 | Cowan | H04W 52/0216 370/311 |
| 2012/0129470 | A1 | 5/2012 | Tandai et al. | |
| 2012/0178379 | A1 | 7/2012 | Chen et al. | |
| 2012/0331315 | A1* | 12/2012 | Diab | G06F 1/266 713/310 |
| 2013/0229963 | A1* | 9/2013 | Asterjadhi | H04W 28/044 370/311 |

FOREIGN PATENT DOCUMENTS

| | | |
|---|---|---|
| WO | 2007/148175 A1 | 12/2007 |
| WO | 2008/023943 A1 | 2/2008 |
| WO | 2010/027175 A2 | 3/2010 |
| WO | WO 2010/027175 A2 | 3/2010 |

OTHER PUBLICATIONS

International Search Report dated Jun. 23, 2014 for PCT/GB2014/051183 filed on Apr. 15, 2014.
Great Britain Search Report dated Oct. 25, 2013 for GB1307187.3 filed on Apr. 22, 2013.

* cited by examiner

COMMUNICATIONS SYSTEM FOR TRANSMITTING AND RECEIVING DATA

CROSS-REFERENCE TO RELATED APPLICATIONS

The present application is based on PCT filing PCT/GB2014/051183 filed Apr. 15, 2014, and claims priority to British Patent Application 1307187.3, filed in the UK IPO on 22 Apr. 2013, the entire contents of each of which being incorporated herein by reference.

FIELD OF THE DISCLOSURE

The present disclosure relates to communications systems for transmitting and receiving data to and/or from communications devices and infrastructure equipment, and methods of communicating data.

BACKGROUND OF THE DISCLOSURE

Mobile communications systems continue to be developed to provide increased capacity and expand the number and variety of devices that can be served. Recently, third and fourth generation mobile telecommunication system, such as those based on 3GPP defined UMTS and Long Term Evolution (LTE) architectures have been developed to support more sophisticated communications services to personal computing and communications devices than simple voice and messaging services offered by previous generations of mobile telecommunications systems. For example, with the improved radio interface and enhanced data rates provided by LTE systems, a user may enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the network is possible, is expected to increase rapidly. More recently it has been recognised that rather than providing high data rate communications services to certain types of electronic devices, it is also desirable to provide communications services to electronic devices that are simpler and less sophisticated. Expanding the variety of devices that are served beyond those that require high data rate connections also significantly increases the number of devices that may potentially be served and therefore the number of possible revenue streams for telecommunications systems providers. Machine type communication devices provide an example of these new devices which may be served. MTC devices may be semi-autonomous and autonomous wireless communication devices which may communicate small amounts of data on a relatively infrequent basis. Some examples include so-called smart meters which, for example, are located in house of a customer of a utility provider and periodically transmit information back to a central MTC server relating to the customer's consumption of a utility such as gas, water, electricity and so on.

SUMMARY OF THE DISCLOSURE

According to the present disclosure there is provided a communications system comprising infrastructure equipment arranged to provide a wireless interface to a communications device. The communications device comprises a controller and a transceiver configured to transmit and/or receive signals representing the data to and/or from the infrastructure equipment over the wireless interface. The transceiver under control of the controller is configured to transmit a request for services message to the infrastructure equipment, and to receive a response message to the request for services message transmitted from the infrastructure equipment. The request for services message includes a delay period and the infrastructure equipment, in response to receiving the request for services message, processes the request to form the response message and stores the response message for transmission to the communications device. The response message is stored until the expiry of the delay period or transmission of the response message, and the controller is configured after transmission of the request for services to configure the transceiver to enter a reduced power state in which the amount of power consumed by the transceiver is reduced and to exit the reduced power state to receive the response message.

Including a delay period in a request for services message from a communications device to infrastructure equipment in a communications system allows the communications device to have more accurate knowledge of when a response to the request for services will be transmitted by the infrastructure equipment. As a result of this knowledge the transceiver of the communications device is able to enter a reduced-power state for a period of time and exit the reduced power mode prior to the transmission of the a response to the request without possibility that it may not receive the response when the response is transmitted. This therefore allows the communications device to reduce power consumption whilst still receiving the response. This approach may also be beneficial when the processing of a request at infrastructure equipment takes a minimum period of time. For example if it is known that a response may not be transmitted before the end of this minimum processing period it may be more energy efficient to configure the transceiver to enter a reduced power sate for at least the minimum processing period so that the transceiver does not attempt to receive the response before it can possibly be transmitted.

In some embodiments of the present disclosure the controller is configured to control the transceiver to transmit a random access request message to the infrastructure equipment requesting up-link communications resources for transmitting the request for services message. The infrastructure equipment is configured to transmit a random access request response to the communications device granting up-link communications resources in response to receiving the random access request, and the communications device is also configured to transmit the request for services message in the allocated up-link communications resources to the infrastructure equipment.

In other embodiments the controller is configured to control the transceiver prior to the expiry of the delay period to transmit a second random access request message to the infrastructure equipment requesting up-link communications resources for transmitting a request for a response message to the infrastructure equipment. The request for a response message requests a response to the request for services message, and in response to a granting of the up-link communications resources from the infrastructure equipment, to transmit the request for response message in the allocated up-link communications resources to the infrastructure equipment, and to receive a response message from the infrastructure equipment providing the requested services to the communications device in response to the request for services message. The infrastructure equipment is configured to transmit a random access request response to the communications device granting up-link communications resources in response to receiving the second random access request from the transceiver, to receive the request for a response message requesting a response to the request for services message, and to transmit a response message to the communications device providing the requested services to the communications device in response to the request for services message.

The granting of resources to the communications device to request a response to the request for services enables the communications device to specify a time when it wishes to receive the response to the request for services whilst not having to specify such a time when the request for services is transmitted. This may overcome synchronisation issues between the communications device and the infrastructure equipment that may arise when the transceiver of the communications device is in a reduced power state for a long period of time. The transmission of a request for a response by the communications device also allows the infrastructure equipment to have processed the request so that it is available for transmission when the request for a response is received. Furthermore, the transmission and reception of a request for a response may allow the infrastructure equipment to schedule the transmission in a conventional manner and may provide the communications device with flexibility in when it wishes to receive the response to the request for services.

In a further embodiment the controller is configured to control the transceiver to exit the reduced power state to receive the response message in response to the expiry of the delay period, and the infrastructure equipment is configured to transmit the response message to the transceiver in response to the expiry of the delay period.

The transmission of the response to the request for services in response to the expiry of the delay period allows the response to the request for services to the transmitted and received at a predetermined time without further random access request or requests for a response. This may therefore allow the transceiver to remain in the reduced power state for a longer period of time and reduce power consumption at both the communications device and the infrastructure equipment.

In yet another embodiment the random access request message transmitted by the transceiver to the infrastructure equipment requesting up-link communications resources includes an identifier identifying the communications device which has transmitted the random access request message. The transceiver is configured to receive a random access response message from the infrastructure equipment which provides the granted up-link communications resources for transmitting the request for services message, the random access response including the identification number. Prior to the expiry of the delay period the transceiver is configured to transmit a second random access request message, which includes the identification number to the infrastructure equipment, and to receive in response to the second random access request message a response message from the infrastructure equipment providing the requested services to the communications device in response to the request for services message. The infrastructure equipment is also configured to transmit a random access response message providing the granted up-link communications resources for the transceiver to transmit the request for services message to the infrastructure equipment, to receive the second random access request message from the communications device, and to transmit, in response to the second random access request message, a response message providing the requested services to the communications device in response to the request for services message.

Transmitting and receiving a second random access request including the same identifier enables the communications device to identify itself to the infrastructure equipment as the device which transmitted the request for services. A response to the request for services can therefore be transmitted by the infrastructure equipment and received by the communications device without the transmission of a request for a response to the request for services in addition to the second random access request. This may allow the transceiver to remain in the reduced power state for a longer period of time and allow the transceiver and infrastructure equipment to transmit fewer messages, thus reducing power consumption and scheduling complexity.

Various further aspects and embodiments of the present disclosure are provided in the appended claims, including but not limited to infrastructure equipment arranged to provide a wireless interface to a communications device and a method for transmitting and receiving signals representing data to and/or from infrastructure equipment.

BRIEF DESCRIPTION OF THE DRAWINGS

Embodiments of the present disclosure will now be described by way of example only with reference to the accompanying drawing in which like parts are provided with corresponding reference numerals and in which.

DESCRIPTION OF EXAMPLE EMBODIMENTS

Figure 1:
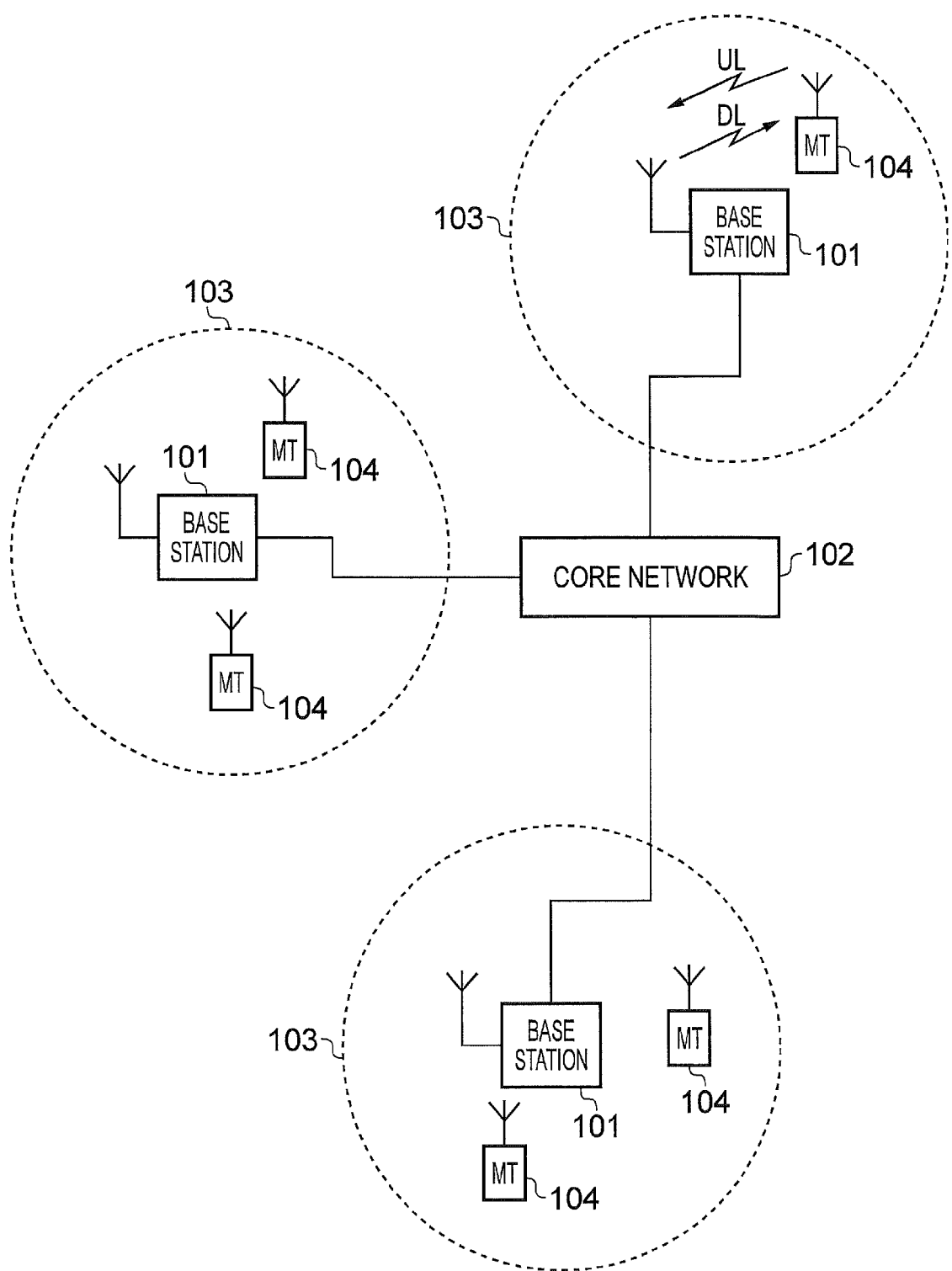
FIG. 1 provides a schematic diagram of an example communications network.

FIG. 1 provides a schematic diagram illustrating a conventional mobile communications system. The system includes a plurality of base stations 101 connected to a core network 102 where the base stations and core network are arranged to provide a wireless radio interface. Each of the plurality of base station provides a service area 103 and serves a plurality of communications devices 104 which are located within the service area 103. Each of the communications devices 104 within a service area transmits and receives data to and from the base station 101 over a radio uplink and a radio downlink respectively of the wireless interface. Correspondingly, each base station transmits and receives data to and from the communications devices that are within its service area over the radio downlink and radio uplink respectively. Data transmitted to the base stations 101 may be routed to the core network 102 so that services such as for example voice calling, internet access, authentication, mobility management and charging and so on may be provided. In some examples FIG. 1 may represent an LTE network and the base stations may be referred to as enhanced Node B (eNodeB or eNB) and in other examples the base station and core network may be referred to infrastructure equipment. In an LTE network the communications devices may also be referred to as user equipment (UE), which may for example be mobile telephones, tablets, machine type communications devices etc. However, in other examples the communications devices may be referred to as mobile terminals and communications devices etc.

Mobile telecommunications networks or systems utilise a wide variety of different radio interfaces, for example, 3GPP LTE utilises an Orthogonal Frequency Division Multiplexing (OFDM) radio interface. OFDM operates by dividing the available bandwidth into a plurality of orthogonal sub carriers and then dividing up this resource to form a predetermined structure which can convey data to the communications devices in a system. In the downlink of an LTE system the available resources are divided temporally into radio frames which last 10 ms, with each frame comprising 10 subframes which each last 1 ms. The subframes of an LTE signal are then further divided into OFDM symbols and resource blocks that comprise 12 subcarriers over a period of 0.5 ms or 6 or 7 symbols. These resource blocks form the physical channels of a LTE subframe which are used to carry data on the downlink and the uplink.

Figure 2:
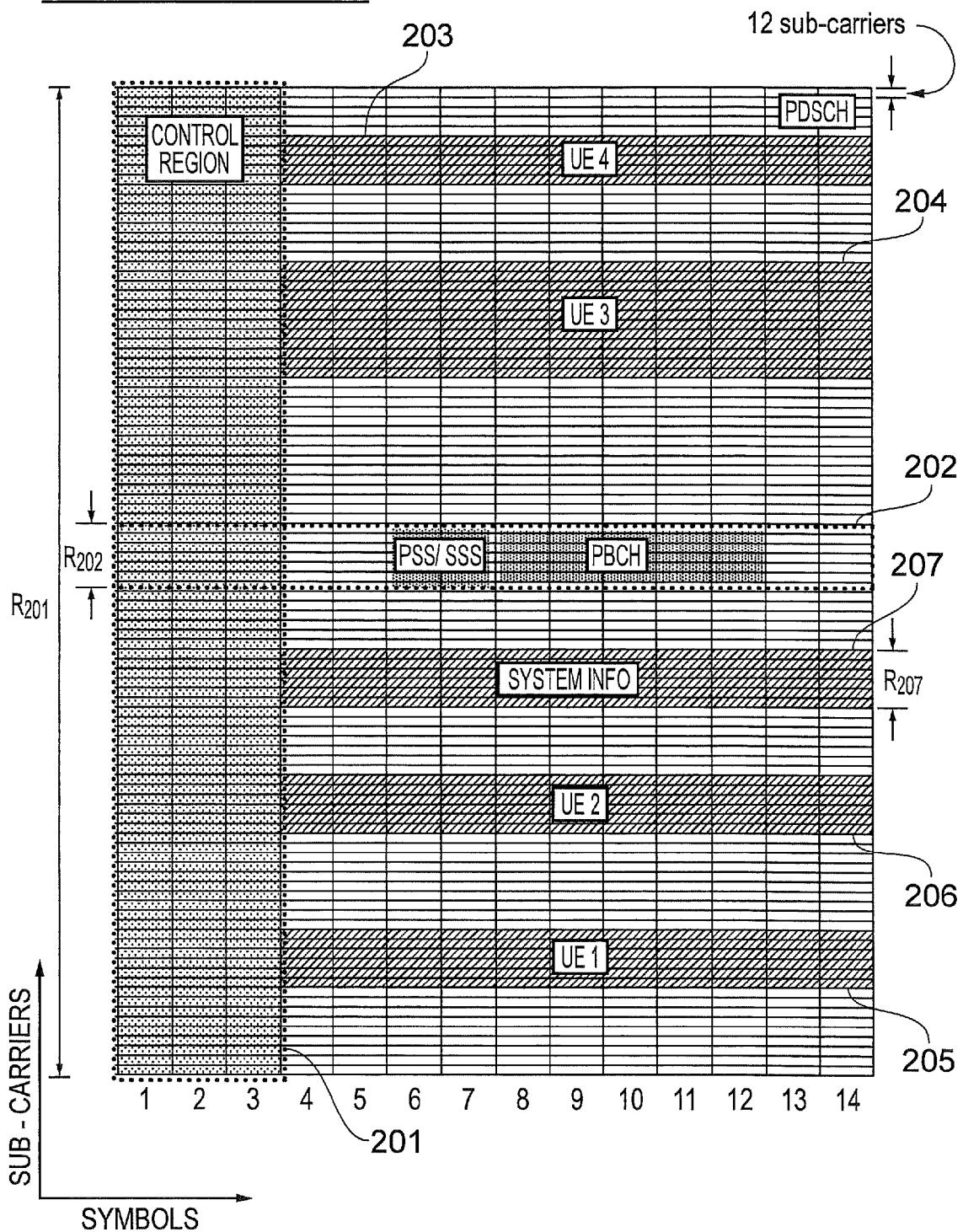
FIG. 2 provides a schematic diagram of a structure of an example downlink LTE subframe.

FIG. 2 provides a schematic diagram providing a grid which illustrates the structure of an example of a two downlink LTE subframes. The subframes comprise a predetermined number of symbols which are transmitted over a 1 ms period. Each symbol comprises a predetermined number of orthogonal sub-carriers distributed across the bandwidth of the downlink radio carrier. The example sub-frame shown in FIG. 2 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 2, each individual resource element is not shown, but instead each individual box in the sub-frame grid corresponds to twelve sub-carriers transmitted on one symbol.

FIG. 2 shows resource allocations for four communications devices 203, 204, 205, 206. For example, the resource allocation 203 for a first communications device (UE 1) extends over five blocks of twelve sub-carriers, the resource allocation 206 for a second communications device (UE2) extends over six blocks of twelve sub-carriers and so on. Control channel data is transmitted in a control region 201 of the sub-frame comprising the first n symbols of the sub-frame where n can vary between one and three symbols for channel bandwidths of 3 MHz or greater and where n can vary between two and four symbols for channel bandwidths of 1.4 MHz. The data transmitted in the control region 201 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific communications devices (UEs). Thus, the PDCCH data transmitted in the control region 201 of the sub-frame shown in FIG. 2 would indicate that UE1 has been allocated the first block of resources 203, that UE2 has been allocated the second block of resources 204, and so on. In subframes where it is transmitted, the PCFICH contains control data indicating the duration of the control region in that sub-frame (i.e. between one and four symbols) and the PHICH contains HARQ (Hybrid Automatic Request) data indicating whether or not previously transmitted uplink data has been successfully received by the network. In certain subframes, symbols in a central band 202 of the sub-frame are used for the transmission of information including the primary synchronisation signal (PSS), the secondary synchronisation signal (SSS) and the physical broadcast channel (PBCH) mentioned above. This central band 202 is typically 72 sub-carriers wide (corresponding to a transmission bandwidth of 1.08 MHz). The PSS and SSS are synchronisation signals that once detected allow a communications device 104 to achieve frame synchronisation and determine the cell identity of the base station (eNB) transmitting the downlink signal. The PBCH carries information about the cell, comprising a master information block (MIB) that includes parameters that the communications devices require to access the cell. Data transmitted to individual communications devices on the physical downlink shared channel (PDSCH) can be transmitted in the remaining blocks of communications resource elements of the subframe.

FIG. 2 also shows a region of PDSCH containing system information and extending over a bandwidth of $R_{207}$. The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 2. As is known in the art, subcarriers carrying data transmitted on the PDCCH, PCFICH and PHICH are typically distributed across the entire bandwidth of the sub-frame. Therefore a conventional communications device must be able to receive the entire bandwidth of the sub-frame in order to receive and decode the control region.

During normal operation of a LTE communications device the device will monitor the PDCCH for information on the resources in has been allocated in the PDSCH and then receive the data that is present in its allocated resources. The PDSCH of an LTE downlink subframe allocated to system information also comprises a number of identifiers or identifying sequences. Theses identifiers are then included in preambles which are used for random access capabilities for communications devices not currently current connected to the base station (RRC_Idle). The uplink subframes may comprise a corresponding physical random access channel (PRACH) over which preambles or other identifying numbers or sequences may be sent to initiate a connection with a base station where the location of the PRACH channel is indicated in the system information. This random access procedure will be explained in more detail below.

In mobile communication systems, communications devices may have more strict power constraints than a base station because they are often battery powered. Consequently, in order to reduce power consumption at a communications device, a common design criterion is to minimise the transmission and reception of control information and data at a communications device. To achieve power reductions communications devices may disconnect from a network in addition to times where the communications device is turned off. When emerging from a disconnected state a communications device may be required to initiate a connection with a base station. For example, in an LTE system when a communications device is first switched on or is otherwise not connected to a base station, in order to send and receive data the communications device is first required to connect to a base station.

Figure 3:
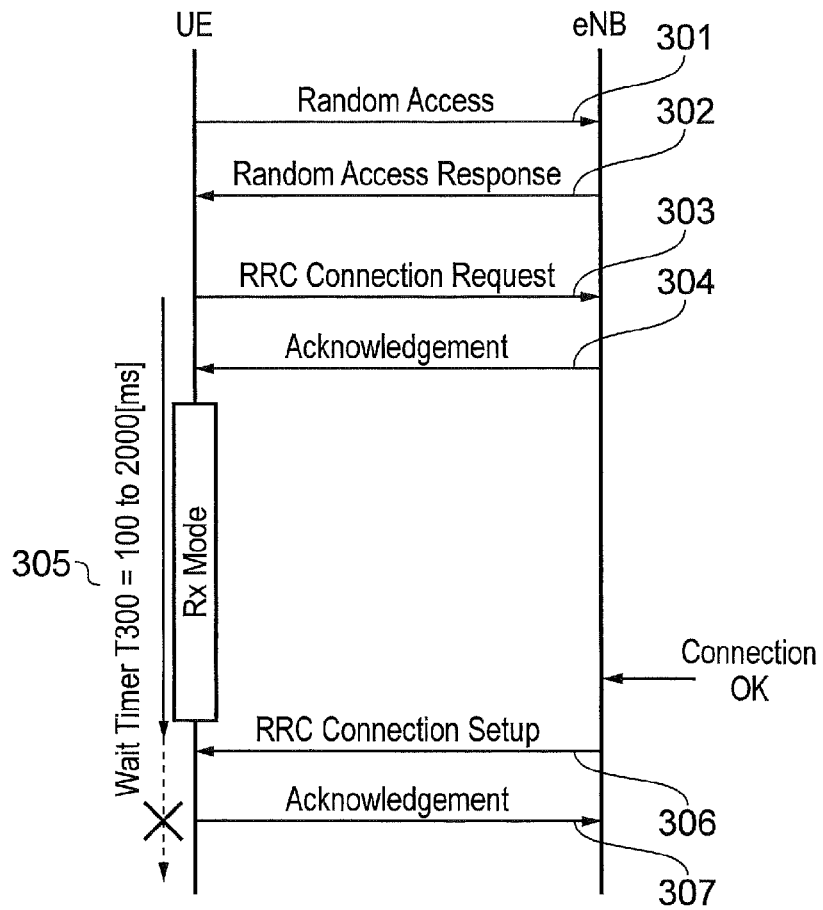
FIG. 3 provides a diagram of an example RCC connection procedure in an LTE network.

FIG. 3 provides a diagram illustrating the process by which a communications device may connect to a base station in an LTE network and therefore transition between RRC_Idle to RRC_Connected. Initially the communications device is not synchronised with the OFDM frames and therefore the communications device first detects primary synchronisation and secondary synchronisations signals. These signals are utilised by the communications device to synchronise with downlink frames transmitted by the base station. Once synchronised with the downlink frames the communications device is able to receive the control information on the PDCCH and PBCH and subsequently receive the system information which conveys the identifiers for the preambles and PRACH location which are used for an uplink random access procedure. Once an identifier has been received it is transmitted in a preamble over the PRACH channel to the base station in a random access request message illustrated by the communication 301 in FIG. 3. The transmission of the random access request message to the base station indicates that the communications device requires resources in the up-link and possibly the downlink to be allocated. In response to receiving the random access request message the base station allocates resources to the communications device and transmits a random access request response message 302 to the communications device. The random access response 302 indicates to the communications device the resources which have been allocated to it and allows the communications device to synchronise with the uplink frames of the base station so that a further random access procedure is not required and timing advance can be implemented.

In response to receiving the random access response 302 and being synchronised with the uplink frames of the base station, the communications device may transmit a radio resource control (RRC) connection request 303 to the base station over the up-link resources allocated to the communications device in the random access response 302. This RRC connection request represents a request to the communications network to establish a radio communications bearer for transmitting data to and/or from the communications device and the communications network or base station, however, it may also be a request for other types of service from the base station. When the RRC connection request message 303 has been received by the base station the base station acknowledges the correct receipt of the request by transmitting an acknowledgment 304 to the communications device. The acknowledgment 304 does not represent a successful connection but simply the correct reception of the data within the RRC connection request. The correct reception of the request may be assessed via the use of a cyclic redundancy check (CRC) or similar error detection methods. A further request confirming an RRC connection setup 306 is required to be transmitted and received by the base station and communications device respectively. In a mobile communication system such as that depicted in FIG. 1, when a connection or other request is made by a communications device this request may be required to be passed onto a subsequent entity in the core network, for example an eNB may pass a request onto an MME or SGW. Consequently, the processing time associated with an RRC connection request may be variable and a response to a RRC connection request may not be transmitted by the base station to a communications device immediately. In order take account of this situation, in an LTE system the communications device attempts to receive a response to the RRC connection request in a window of a predetermined duration. In response to the sending of the RRC connection request the communications device commences a wait timer 305 during which the communications device attempts to receive a response to the RRC connection request. For example, in an LTE system the device sets a wait timer to a one of a plurality of predetermined values specified by a timer T300 that is broadcast by the eNB in the system information block, where the timer may have a value of up to 2000 ms. Once the RRC connection request has been processed and the connection is confirmed, a RRC connection setup message 306 is transmitted to the communications device and received by the communications device if it is transmitted before expiry of the wait timer at the communications device. Once the communications device has received the RRC connection setup the communications device transmits an acknowledgement 307 to the base station in order to acknowledge the safe receipt of the RRC connection setup message. If an acknowledgment is not received by the base station, the base station may retransmit the RRC connection setup message.

During the period the timer at the communication device is running, the communications device attempts to receive the RRC connection setup communication. To do this the communications device monitors the PDCCH which indicates to the communications device whether the RRC connection setup message will be transmitted in the forthcoming PDSCH channel resource blocks. However, because transmission time of the response to the RRC connection request is unknown, the communications device has to receive the control information in every PDDCH until it receives the PDDCH that specifies the location of the RRC connection setup message or until the timer expires. The communications device may therefore be in receiving mode for a substantial period of time even though useful data is neither being received or transmitted.

Figure 4:
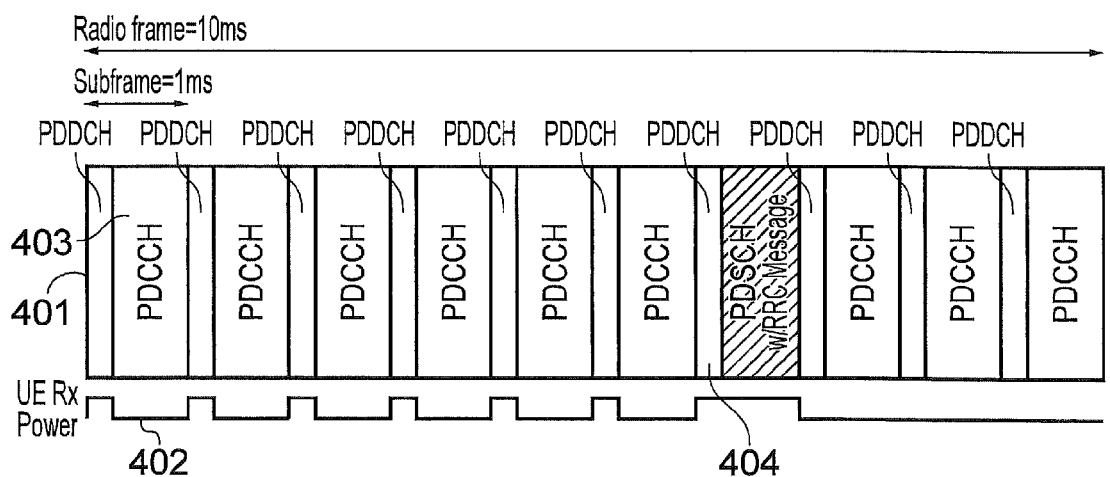
FIG. 4 provides a diagram illustrating the power consumption of a receiver operating in accordance with the procedure of FIG. 3.

FIG. 4 illustrates the operation of a communications device to receive a RRC connection setup message during a 10 ms radio frame. Throughout the radio frame, each PDCCH transmission 401 is received until the RRC connection setup is received. Therefore the controller within the communications device powers up the transceiver or receiver, as shown by the UE receiver power 402 plot in FIG. 4, in order to establish whether the communications device has been allocated resources in the subsequent PDSCH 403. Consequently, the only PDCCH instance which is received that conveys useful data is PDCCH 404.

In communications devices which have strict power constraints, such as MTC devices, these periods of PDCCH reception may represent a significant drain on the communications devices resources. Consequently, it may be beneficial if the reception period defined by the timer is avoided such that the communications device reduces the power consumed by the transceiver during periods that it is not possible that the RRC connection setup message will be transmitted, for examples, because of a minimum processing time of the request by the communications network.

Although the response timer and reception procedure outlined above has been described with reference to an LTE system, this issue of redundant reception is not restricted to LTE systems. For example, in any communication system where a request for services is made and a response is required (in addition to an acknowledgment) but the timing of the transmission of the response is not certain, a similar technical problem may occur. Thus embodiments of the present technique can apply to different message exchanges where a request is made and a response is provided, for instance, a device which is an a connected state with a system may transmit a request to the system which takes a period of time to process and fulfil e.g. retrieving data, preforming analysis of data or requesting a service. Embodiments of the present technique therefore can reduce power consumption of communications devices in respect of a transceiver's attempt to receive a response from the system for an extended period of time commencing with the transmission or acknowledgment of the reception of the request. Furthermore, although in the above discussed scenarios the communications device is preforming the request, the request may be transmitted by any entity in a system as long as any substantive response (i.e. not simple CRC acknowledgment etc.) to the request is not able to be transmitted immediately or it is not certain when a response to the request will be available for transmission. It may also not be required that a random access procedure be performed before any request because the power consumption issues are related to the substantive request and the procedure for receiving a response to the substantive request.

In LTE networks a reception technique termed discontinuous reception (DRX) may partially mitigate some of the problems outlined above. However, DRX has a number of shortcomings which limit its application. DRX is a cyclic or period process that is negotiated between the communications device and the base station prior to the commencement of DRX. A single negotiation defines a plurality of periods that the receiver in the communications device will turn-on and attempt to receive control information from the base station. However, it is likely that a request from a communications device as described above will be a one-off or aperiodic and therefore attempting to use DRX would result in significant overheads because it will check control instances even when there is no useful data to be received. A receiver performing DRX may operate in a similar manner to that illustrated in FIG. 4, but will receive instances of control information less frequently, for example, every three frames. However, although power consumption may be reduced by DRX, control information may still be received even when there is no guarantee there will be data in the subsequent PDSCH. Consequently, inefficiencies in the reception of responses to requests may remain even with the use of DRX.

Figure 5:
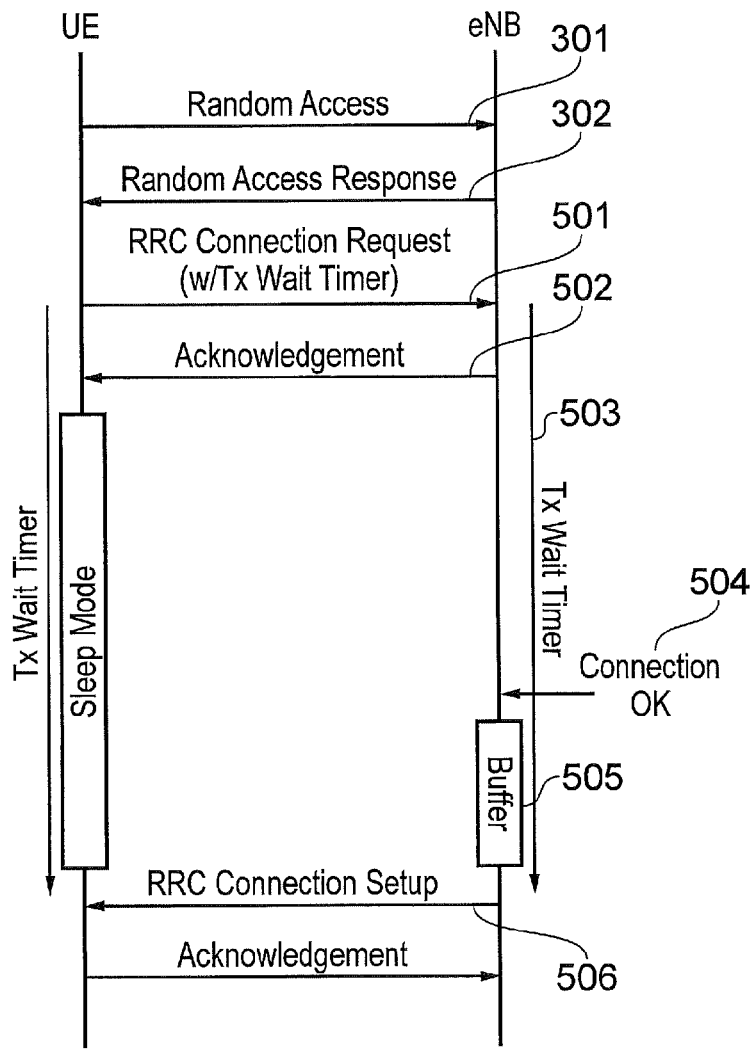
FIG. 5 provides a diagram of an RRC connection procedure in an LTE network in accordance with an example embodiment of the present disclosure.

FIG. 5 illustrates a procedure in accordance with a first example embodiment of the present disclosure. The procedure illustrated in FIG. 5 is with reference to an RRC connection request in LTE system described above but may be applied to any request for services and response procedure to the request where the timing of processing and transmission of a response to a request may be unknown. The steps and messages 301 to 302 are substantially similar to those described with reference to FIG. 3, however, the RRC connection request 501 additionally contains an indication of a defined delay period or transmission wait timer which defines a period relative to the transmission of the RRC connection request. This delay period may then be used to define the desired transmission time of a response to the RRC connection request and the point in time at which the communications device attempts to receive a response. The delay period may be defined by the communications device, the communications network or the base station. For example, the communications device may in a system information block receive an indication of a delay period that should be used or receive a set of delay period from which it chooses an appropriate one. When the RRC connection request 501 has been received, the base station acknowledges the correct reception of the data contained with the RRC request 501 with an acknowledgment 502. Upon receiving the RRC request 501, the base station extracts the delay period from the RRC request and commences a timer 503 at the base station or elsewhere in the base station side of the system which monitors the elapsed time since transmission of the request relative to the delay period. During the delay period the request received by the base station is processed and an appropriate response composed. This processing may require communication with other entities in the system or core network and therefore may take an extended period of time. Once the RRC connection has been processed and confirmed, and the response composed 504, the response is stored or buffered 505 in a memory at the base station until the delay period expires such that the storage of the response is dependent on the delay period. Once the delay period has expired the base station transmits the RCC connection setup message 506 such that the transmission of the response is dependent on the delay period. Once the response has been transmitted, the base station awaits an acknowledgment from the communications device to indicate the correct reception of the RRC connection set up message.

At the communications device, prior to the transmission of the RRC connection request message 501 a controller in the communications device may determine an appropriate delay period to be conveyed along with the RRC connection request. The delay period may be generated by the communications device controller or the controller may select a value from a predetermined set of timer values transmitted in the system information in a similar manner to existing T-timers such as T300, T302 etc. In response to transmitting the RRC connection request 501 the controller of the communications device or other controlling means initiates a timer with the delay period and commences the timer. After the transmission of the request the communications device awaits an acknowledgment of the RRC connection request and once this has been received the controller may configure the transceiver to enter a reduced-power mode or state during which it does not transmit or attempt to receive any transmission from the base station. However, the controller may configure the transceiver to enter the reduced power or sleep mode in response to the transmission of the RRC request. The reduced-power state overcomes the power consumption associated with cycling of the transceiver or receiver depicted in FIG. 4 by 402 because it does not attempt to receive any information during this period. The transceiver remains in the reduced-power state until the delay period expires and then enters a receiving mode to receive the PDCCH. It is assumed that the delay period at the communications device and the base station are approximately synchronised so that when the communications device exits the reduced power state the base station soon after transmits the response to the RRC connection request which has been buffered at the base station. In this way the communications device may receive substantially fewer instances of scheduling information on the PDCCH before receiving a response to the RRC connection request. Furthermore data relevant to the communications device will be transmitted whilst the transceiver is awake unlike DRX where a receiver awakes without knowledge of whether there is data to be transmitted. This procedure is further differentiated for DRX because the transceiver is only required to turn-on once and the procedure is not cyclic but dependent on when a request is required to be transmitted.

In some instances congestion in the downlink may result in transmission of the RRC connection setup or response 506 being delayed until resources are available to transmit the response. Consequently, in some examples of the present embodiment there may be a reception window which commences with the expiry of the delay period and within which the base station may transmit and the communications device may receive a response to the RRC connection request. This window may either be specified in the RRC connection request or may be a predetermined window length which is common to all requests where a delay period is specified and the base station buffers a response and the communications device's transceiver enter a low power mode, respectively. Although the use of a reception window may increase a time for which a communications device attempts to receive a response, the duration of the window is likely to be significantly less than the window described in FIG. 3 and therefore energy saving will still be achieved. As well as easing problems related to congestion and scheduling, the utilisation of a window after the delay period, may also overcome any small synchronisation problems resulting from clock drift between the communications device and the base station.

In order to maintain approximate synchronisation between the delay periods at the communications device and the base station, account of the propagation delay and data extraction delay at the base station is required. For instance, when using a timer to time the delay period, at the communications device, the timer commences when the RRC request is transmitted but an equivalent timer at the base station commences once the RRC request has been received, the delay period extracted and the timer started. Consequently, when initiating the timer at the base station compensation may be introduced into the delay period in order to take account of the aforementioned delays associated reception of the request and commencement of the timer. This compensation may help ensure that the communications device does not exit the reduced power mode before the transmission of the RRC connections setup message and therefore does not unnecessarily receive redundant control information in the PDCCH.

In order for advantages of the above described procedure to be fully exploited it is important that an appropriate delay period is determined. A key consideration that determines the minimum delay period is the minimum period of time it will take to process and composes a response to the request at the base station. For instance, a delay period should exceed the minimum possible time before a response is ready for transmission. If this is not the case the communications device may attempt to receive the response when it cannot be transmitted, thus wasting energy. The determination of the delay period may also take into account a number of other factors, for example, the time by which the communications device requires a response, the period the communications device wishes to remain in reduced-power mode, tolerance to delay and mobility issues, and periods specified by the communications network. For example, when considering mobility issues it may be required that the communications device remains within the range of the base station that it submitted the request for the duration of the delay period in order that it can receive the response from the base station at the appropriate time. If the communications device were mobile and the delay period was set at too long a duration, the communications device may have moved out of range of the base station to which it originally made the request. In these circumstances the communications device may not receive the response or additional mobility management and timer management procedures will be required by the core network in order to ensure that the response is transmitted to the communications device at the correct time. In addition to constraints at the communications device there may also be system constraints on the delay period. For instance, there may be a set of delay periods from which an appropriate delay period can be chosen or there may be a maximum delay period that can be specified in order to avoid problems which may occur as a result of clock drift between the communications device and the base station. Furthermore, there may be one or more sets of delay periods stored at the communications device, each set providing a range of delay periods for a request of a certain type each differing types of request may have differing processing times associated with them at a base station. Also, when considering legacy devices in an LTE network they may be configured to use a maximum delay period length if they are unable to select individual delay periods.

The units in which delay periods are defined may vary, for instance the delay period may be defined by a period in time such as milliseconds or a number of frames or subframes. The delay period may be defined as a subframe number at which the response is to be transmitted or the number of elapsed subframes until transmission/reception should occur.

Figure 6:
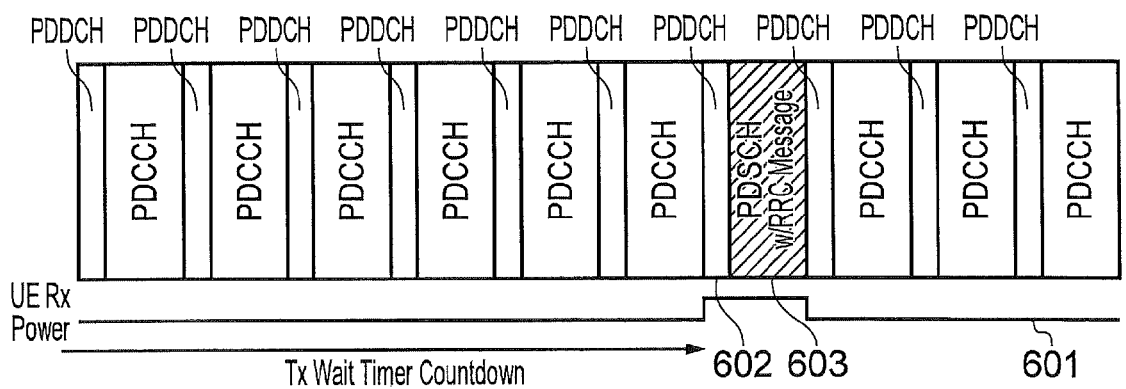
FIG. 6 provides a diagram illustrating the power consumption of a receiver operating in accordance the procedure illustrated in FIG. 5.

FIG. 6 illustrates an example power consumption plot 601 of a receiver or transceiver in a communications device which operates is accordance with the procedure outlined above. As can be seen the delay period expires and controller configures the transceiver to exit the reduced power state, the transceiver then receives the PDCCH 602 in order to identify where in the PDSCH 603 the RRC connection setup message is located and then receives the RCC connection setup message. When comparing FIGS. 4 and 6 it can be seen that the power consumption of the receiver is reduced as fewer PDCCH instances are required to be received before the RCC connection setup message is transmitted. In some examples it may not be necessary to receive any control information prior to receiving the response to the RRC connection request message because the location of the response may have been predetermined.

As mentioned above, the present procedure may be beneficial to MTC devices because of their extremely low power consumption. In one example an MTC device may for the majority of time be in a sleep mode but during off peak periods it may wake-up in order to transmit data on utility consumption to a central server. In this scenario the communications device may transmit an RRC connection request and specify a delay period such that when the delay period expires the MTC device has gathered and processed the data so that it is ready to transmit and can transmit once the delay period expires. In such scenarios the time which the communications device and/or transceiver is awake may be reduced compared to when the data gathering and processing is performed prior to the RRC connection request.

Figure 7:
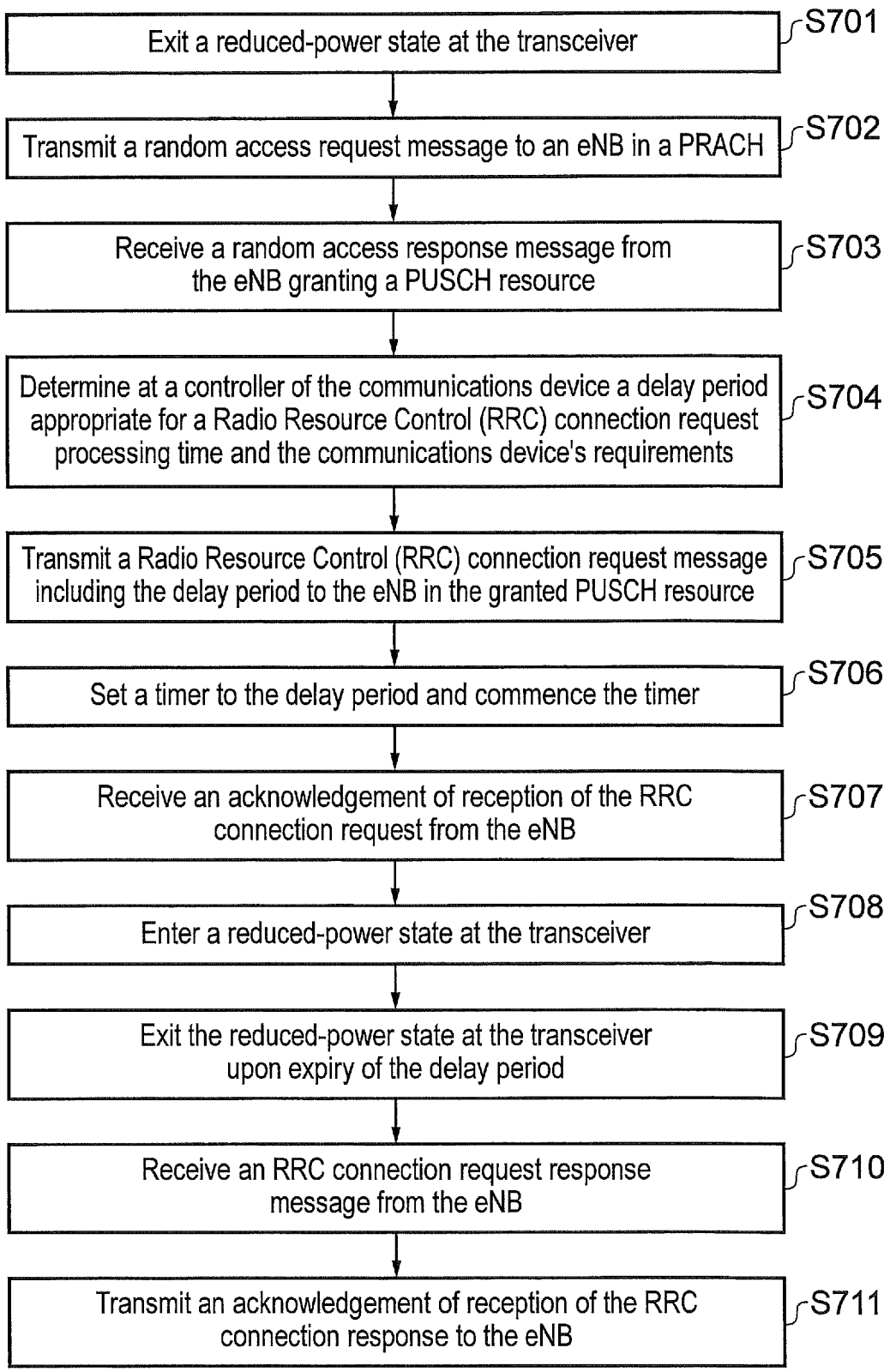
FIG. 7 provides a flow diagram of operations at a communications device operating in accordance with the procedure illustrated in FIG. 5.

FIG. 7 provides a flow diagram summarising the steps taken at a communications device in an LTE system when implementing the process which has been described above with reference to FIGS. 5 and 6. FIG. 7 and the later flow diagrams are not exhaustive nor are all steps essential, for example steps including synchronisation have not been included and the transceiver may not be in a reduced power state prior to transmitting a request.

S701: Exit a reduced-power state at the transceiver

S702: Transmit a random access request message to an eNB in a PRACH.

S703: Receive a random access response message from an eNB granting a PUSCH resource.

S704: Determine at a controller of the communications device a delay period appropriate for a Radio Resource Control (RRC) connection request processing time and the communications device's requirements.

S705: Transmit a Radio Resource Control (RRC) connection request message including the delay period to the eNB in the granted PUSCH resource.

S706: Set a timer to the delay period and commence the timer.

S707: Receive an acknowledgment of reception of the RRC connection request from the eNB.

S708: Enter the reduced-power state at the transceiver.

S709: Exit from the reduced-power state at the transceiver upon expiry of the delay period.

S710: Receive an RRC connection request response message from the eNB.

S711: Transmit an acknowledgement of reception of the RRC connection response to the eNB.

Figure 8:
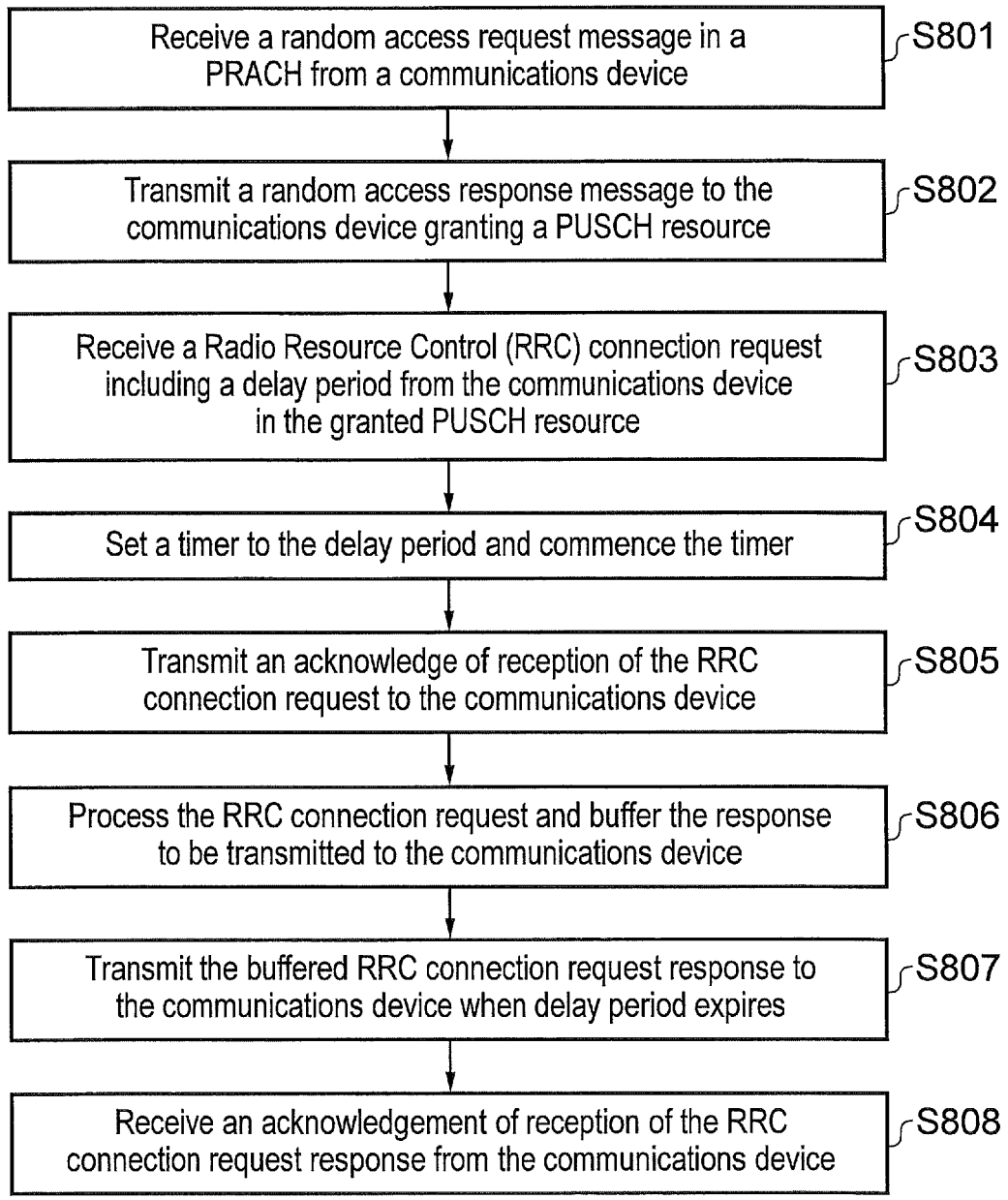
FIG. 8 provides a flow diagram of operations at a base station operating in accordance with the procedure illustrated in FIG. 5.

FIG. 8 provides a flow diagram summarising the steps taken at a base station when implementing the procedure described above with reference to FIGS. 5 and 6 in an LTE system.

S801: Receive a random access request message in a PRACH from a communications device.

S802: Transmit a random access response message to the communications device granting a PUSCH resource.

S803: Receive a Radio Resource Control (RRC) connection request message including a delay period from the communications device in the granted PUSCH resource.

S804: Set a timer to the delay period and commence the timer.

S805: Transmit an acknowledgment of reception of the RRC connection request to the communications device.

S806: Process the RRC connection request and buffer the response message to be transmitted to the communications device.

S807: Transmit the buffered RRC connection request response message to the communications device when delay period expires.

S808: Receive an acknowledgement of reception of the RRC connection request response from the communications device.

Figure 9:
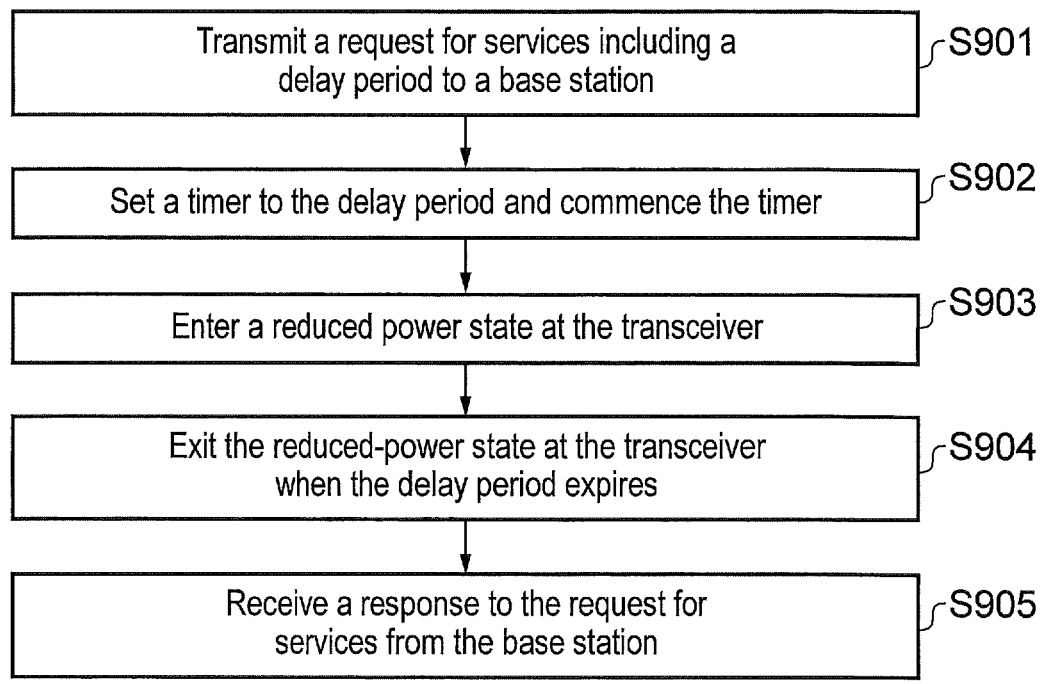
FIG. 9 provides a flow diagram of operations at a communication device operating in accordance with an example embodiment of the present disclosure.

FIG. 9 provides a flow diagram summarising a generalised approach at a communications device to the use of the proposed delay periods when transmitting a request to a base station in a mobile communications system.

S901: Transmit a request for services including a delay period to a base station.

S902: Set a timer to the delay period and commence the timer.

S903: Enter a reduced-power state at the transceiver.

S904: Exit the reduced-power state at the transceiver when the delay period expires.

S905: Receive a response to the request for services from the base station.

Figure 10:
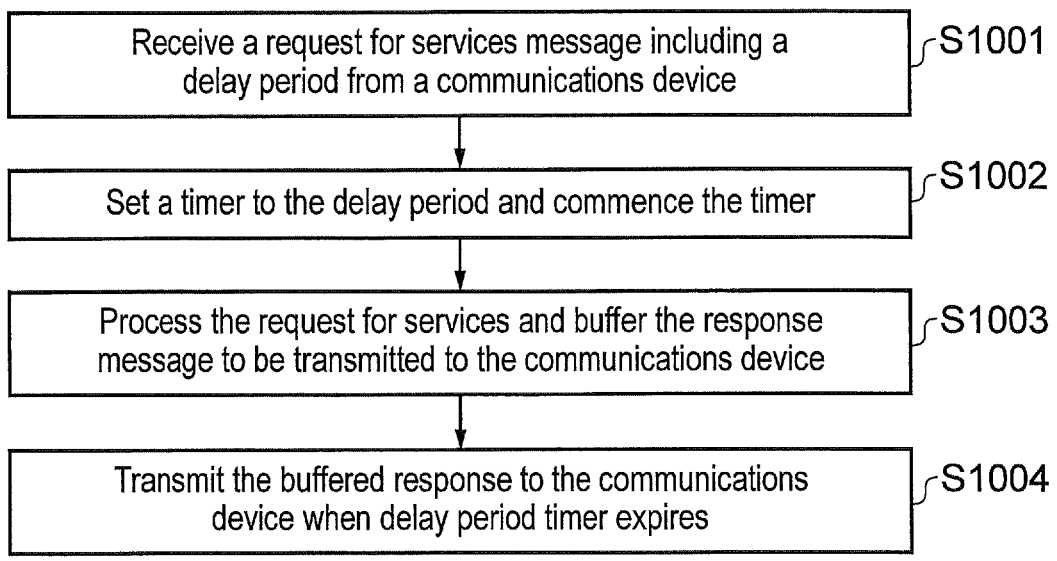
FIG. 10 provides a flow diagram of operations at a base station operating in accordance with an example embodiment of the present disclosure.

FIG. 10 provides a flow diagram summarising a generalised approach at a base station to the use of the proposed delay periods when receiving a request in a mobile communications system.

S1001: Receive a request for services message including a delay period from a communications device.

S1002: Set a timer to the delay period and commence the timer.

S1003: Process the request for services and buffer the response message to be transmitted to the communications device.

S1004: Transmit the buffered response message to the communications device when delay period expires.

Although in FIGS. 7 to 10 possible alternatives or additions to the procedures described with reference to FIGS. 5 and 6 have not been included, these alternations may be in introduced. For example, the eNB or base station may introduce compensation into the delay period in order to take account of the propagation delay and extraction delay when receiving the request and acknowledgments may not be required.

Figure 11:
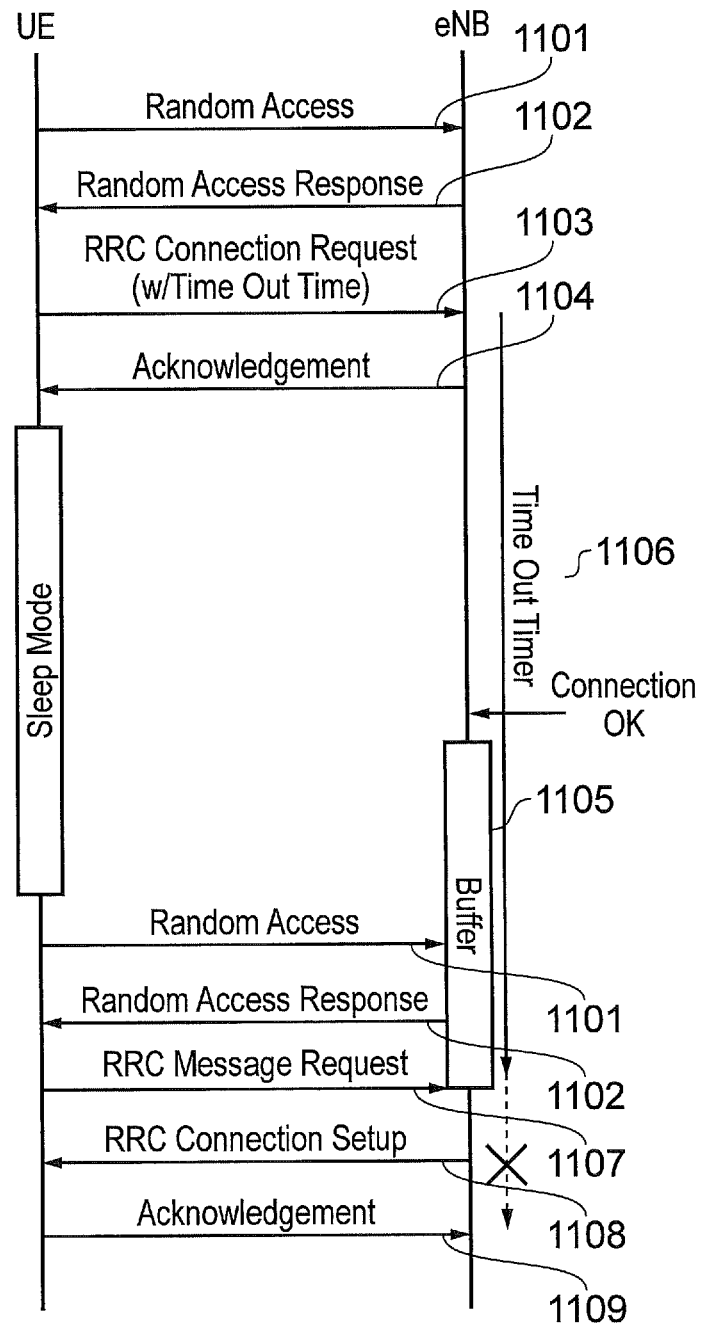
FIG. 11 provides a diagram of an RRC connection procedure in an LTE network in accordance with an example embodiment of the present disclosure.

In a procedure in accordance with a second example embodiment of the present disclosure, a response to a request for services is buffered at the base station until it is requested by the communications device. As one can see in FIG. 11, the initial steps in such a procedure are substantially similar to those in the first examples embodiment, where a random access request is made 1101 by the communications device, a response message to the random access request is transmitted by the base station 1102 and a RRC connection request including a delay period 1103 is transmitted by the communications device to the base station and this is acknowledged by the base station 1104. However, in contrast to the first example embodiment, the response to the RRC connection request is buffered 1105 either until it is requested and successfully received by the communications device or the delay period and/or its associated timer 1106 at the base station expires. Therefore the delay period may also be referred to as a time out period and the timer as a time out timer with respect to the base station. After the communications device receives an acknowledgment of the RRC connection request its controller configures the transceiver to enter a reduced power state where it does transmit or receive. The controller may configure the transceiver to exit the reduced power state either because it wishes to receive the response, the delay period timer has expired or because the elapsed time since the commencement of the timer reaches a predetermined fraction of the delay period.

Once the transceiver has exited the reduced power state, the random access procedure previous utilised (1101, 1102) begins and a subsequent or second RRC connection request 1107 is transmitted which does not include a delay period. When the base station receives this second RRC connection request message the buffered RRC connection request response 1108 may be immediately transmitted to the communications device because there has been sufficient time for the request to have been processed and a response formed since the initial RRC connection request 1103. Once the RRC connection setup message is received at the communications device it may transmit an acknowledgment 1109 to the base station which then removes the buffered response. Although in FIG. 11 a delay period timer is not shown on the communications device side, in some example embodiments a delay period timer will be started after the RRC connection request message 1103 and the transceiver will enter the reduced power state after receipt of the acknowledgment 1104 or transmission of the RRC request message. The transceiver may then exit the reduced power state dependent upon the delay period timer. For instance the transceiver, under control of the controller, may exit the reduced power state a set proportion through the delay period or a set period before the end of the delay period.

Figure 12:
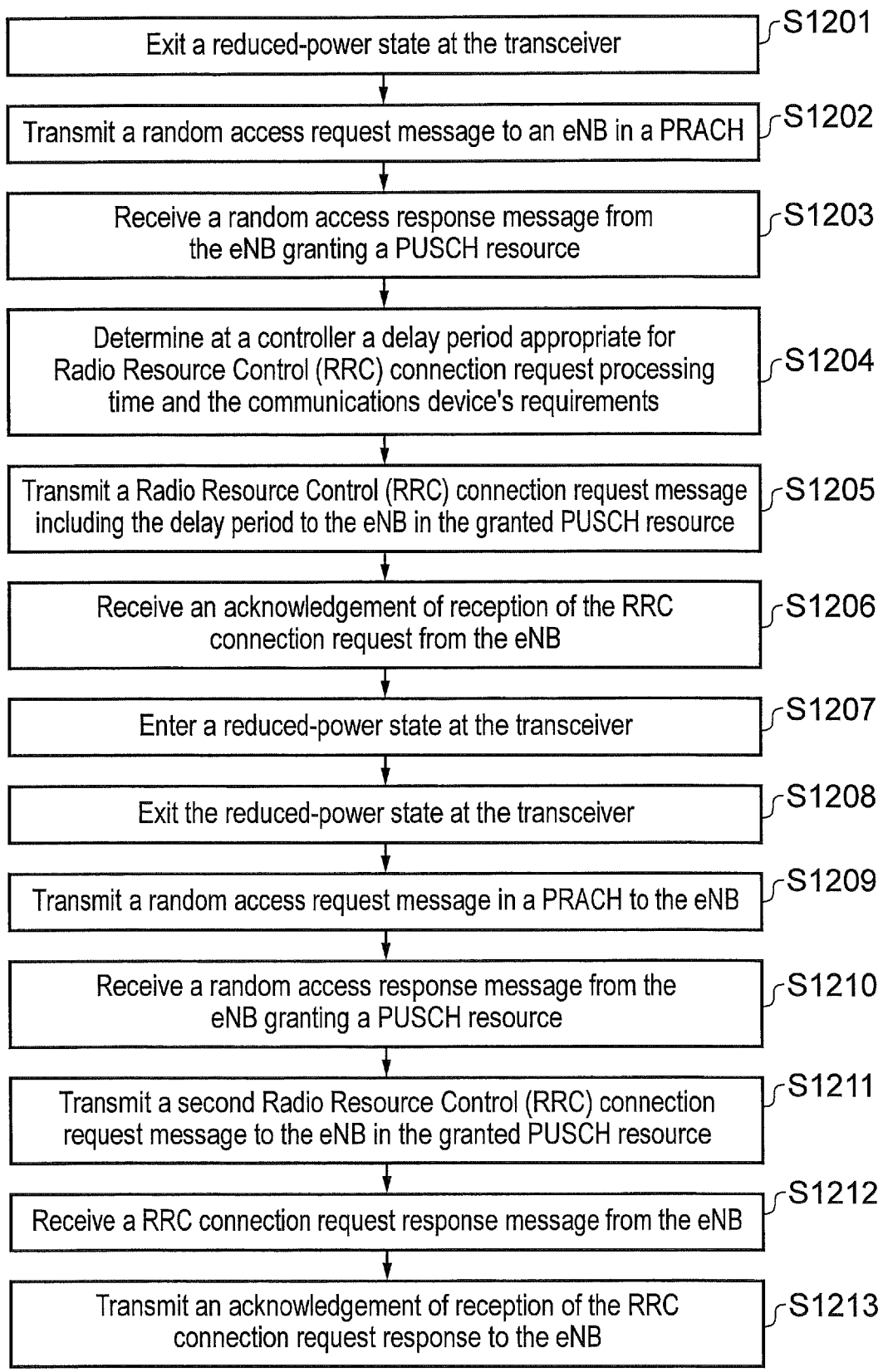
FIG. 12 provides a flow diagram of operations at a communications device operating in accordance with the procedure illustrated in FIG. 11.

FIG. 12 provides a flow diagram summarising the procedure described above at the communications device. The steps refer to the steps which may be taken in an LTE system.

S1201: Exit a reduced-power state at the transceiver.

S1202: Transmit a random access request message to an eNB in a PRACH.

S1203: Receive a random access response from the eNB granting a PUSCH resource.

S1204: Determine at a controller a delay period appropriate for a Radio Resource Control (RRC) connection request processing time and the communications device's requirements.

S1205: Transmit a Radio Resource Control (RRC) connection request including the delay period to the eNB in the granted PUSCH resource.

S1206: Receive an acknowledgment of reception of the RRC connection request from the eNB.

S1207: Enter the reduced-power state at the transceiver.

S1208: Exit the reduced-power state at the transceiver.

S1209: Transmit a random access request in a PRACH to the eNB.

S1210: Receive a random access response message from the eNB granting a PUSCH resource.

S1211: Transmit a second Radio Resource Control (RRC) connection request message to the eNB in the granted PUSCH resource.

S1212: Receive a RRC connection request response from the eNB

S1213: Transmit an acknowledgement of reception of the RRC connection request response to the eNB.

Figure 13:
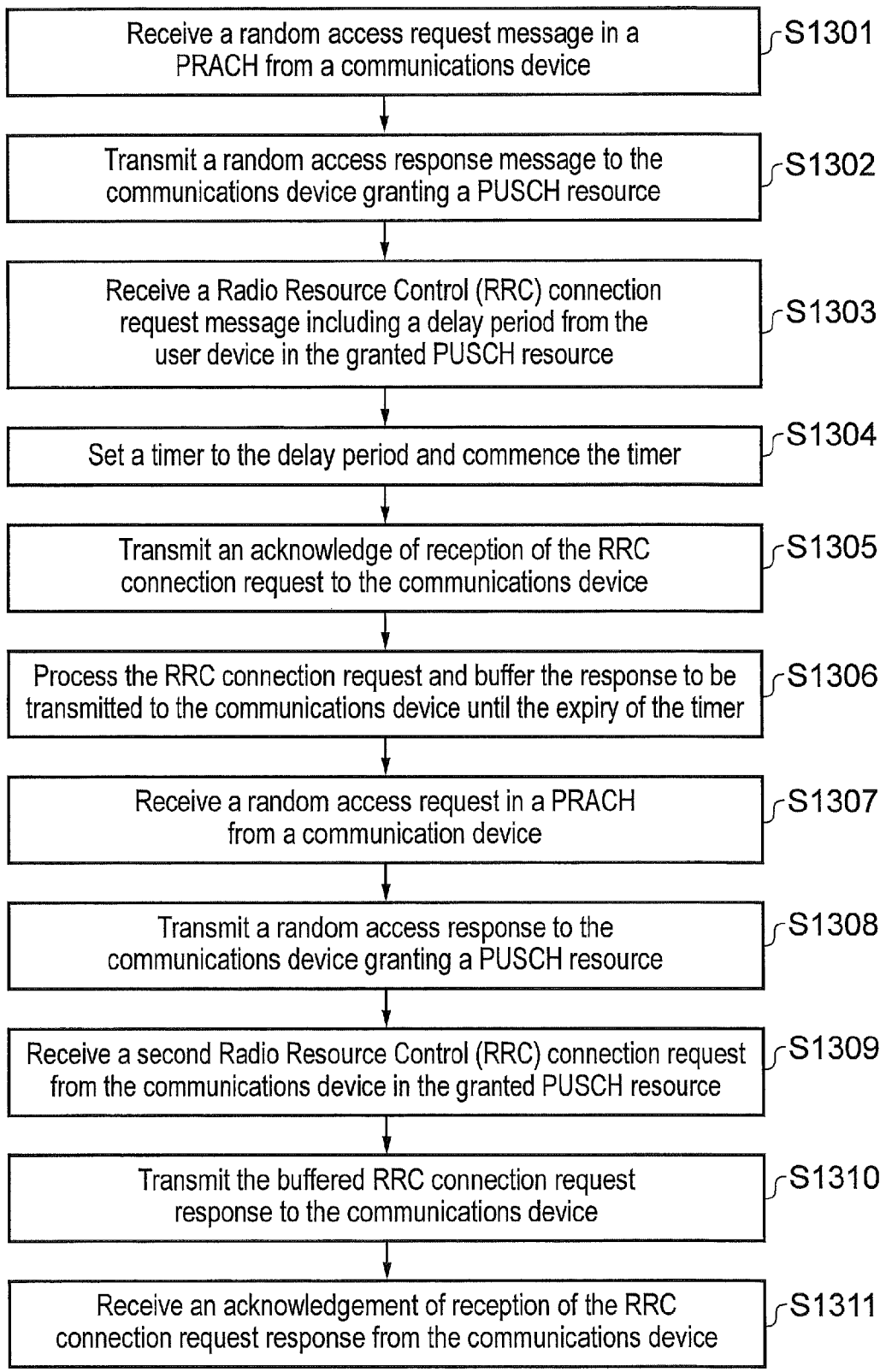
FIG. 13 provides a flow diagram of operations at a base station operating in accordance with the procedure illustrated in FIG. 11.

FIG. 13 provides a flow diagram summarising the procedure described above at the base station. The steps refer to the steps which may be taken in an LTE system.

S1301: Receive a random access request message in a PRACH from a communications device.

S1302: Transmit a random access response message to the communications device granting a PUSCH resource.

S1303: Receive a Radio Resource Control (RRC) connection request message including a delay period from the communications device in the granted PUSCH resource.

S1304: Set a timer to the delay period and commence the timer.

S1305: Transmit an acknowledgement of reception of the second RRC connection request message to the communications device.

S1306: Process the RRC connection request and buffer the response to be transmitted to the communications device until the expiry of the timer or successful transmission of the response.

S1307: Receive a random access request in a PRACH from the communications device.

S1308: Transmit a random access response to the communications device granting a PUSCH resource.

S1309: Receive a second Radio Resource Control (RRC) connection request message from the communications device in the granted PUSCH resource.

S1310: Transmit the buffered RRC connection request response to the communications device.

S1311: Receive an acknowledgement of reception of the RRC connection request response from the communications device.

In a similar manner to FIGS. 9 and 10 the steps set out in FIGS. 12 and 13 may be adapted for use in a system where no random access procedure is required and the request may be of any sort which requires processing such that the response cannot be transmitted to the communications device immediately. Furthermore, the steps set out in FIGS. 12 and 13 maybe adapted by the addition and removal of steps previously described, such as the commencement of a timer at the communications device at Step 1205 upon which transmission of the second request is dependent, delay period compensation at the eNB, and removal of the acknowledgment steps.

Figure 14:
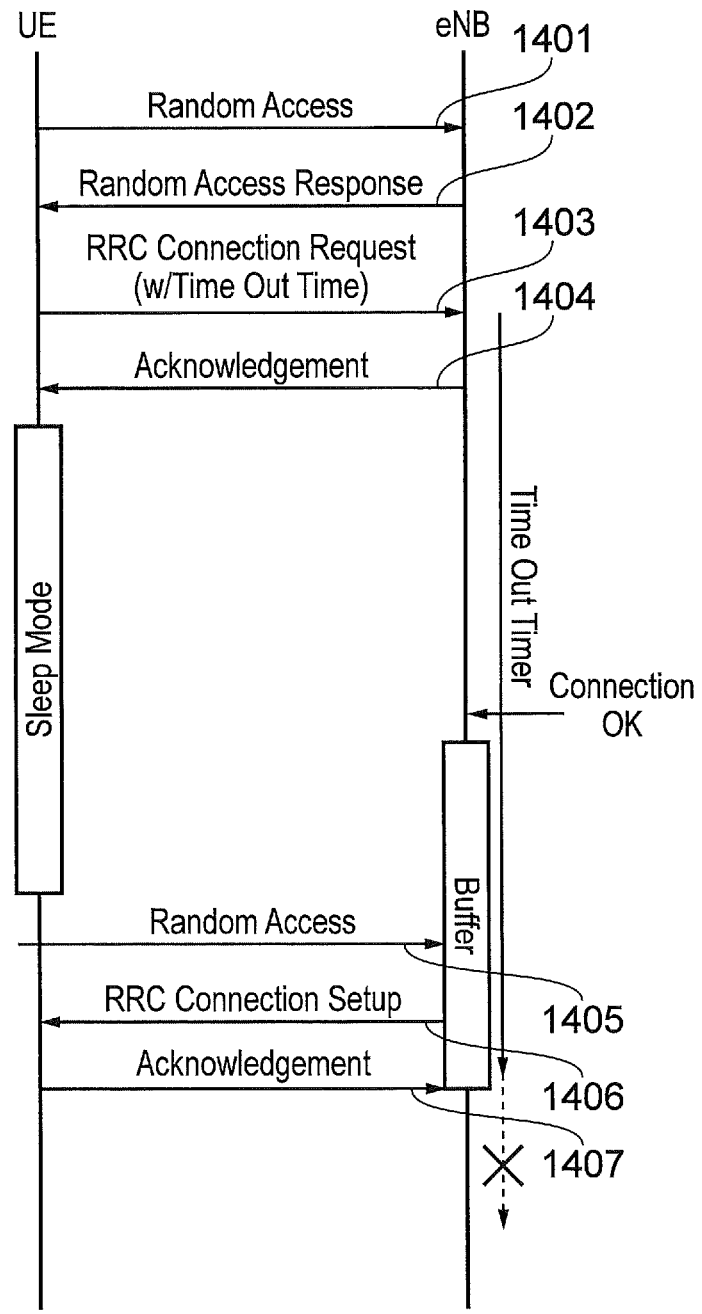
FIG. 14 provides a diagram of an RRC connection procedure in an LTE network in accordance with an example embodiment of the present disclosure.

In a further embodiment in accordance with an example of the present disclosure, a subsequent or second random access request is utilised to signal to the base station that the communications device wishes to receive a response to its request. FIG. 14 illustrates this procedure in an LTE network. The steps in this procedure are substantially similar to those described with reference to FIGS. 11 to 13. However instead of performing a full random access procedure when the transceiver at the communications device exits the reduced power state, the communications device performs the first step of the random access procedure to initiate the transmission of the RRC connection setup message. As previously described, when a communications device preforms a random access request to return from an RCC_Idle mode the communications device sends one of a fixed number of identifiers in a preamble to the base station, where the identifiers are advertised in one of the system information blocks in the downlink. In the embodiment shown in FIG. 14, the communications device sends the same identifier in the preamble at 1405 as sent in the preamble at 1401. Consequently, the base station can recognise that it is the same communications device which transmitted the RRC connection request with the delay period and can transmit the buffered RCC connection setup message upon reception of the preamble at 1405. This procedure reduces the number of steps and transmission which have to be performed relative to the procedure illustrated in FIGS. 11 to 13 and therefore may reduce complexity and power consumption at both the communications device and the base station. However, unless the identifier allocations are fixed it is possible that during the period in which the transceiver at the communications device is in the reduced power mode, another communications device may have randomly chosen the same identifier in order to connect to the base station and therefore may transmit a random access request with the same identifier. This may then lead to the response to the RRC connection request being wrongly transmitted. If the response is wrongly transmitted it will not be acknowledged by the second communications device or the intended communications device and therefore the response will remain buffered until the response is transmitted and an acknowledgment received from the intended communications device, or the delay period expires. Although this may overcome the problems associated with randomly selected preamble identifiers, it may contribute towards congestion because unnecessary messages may be transmitted over the communications network.

Figure 15:
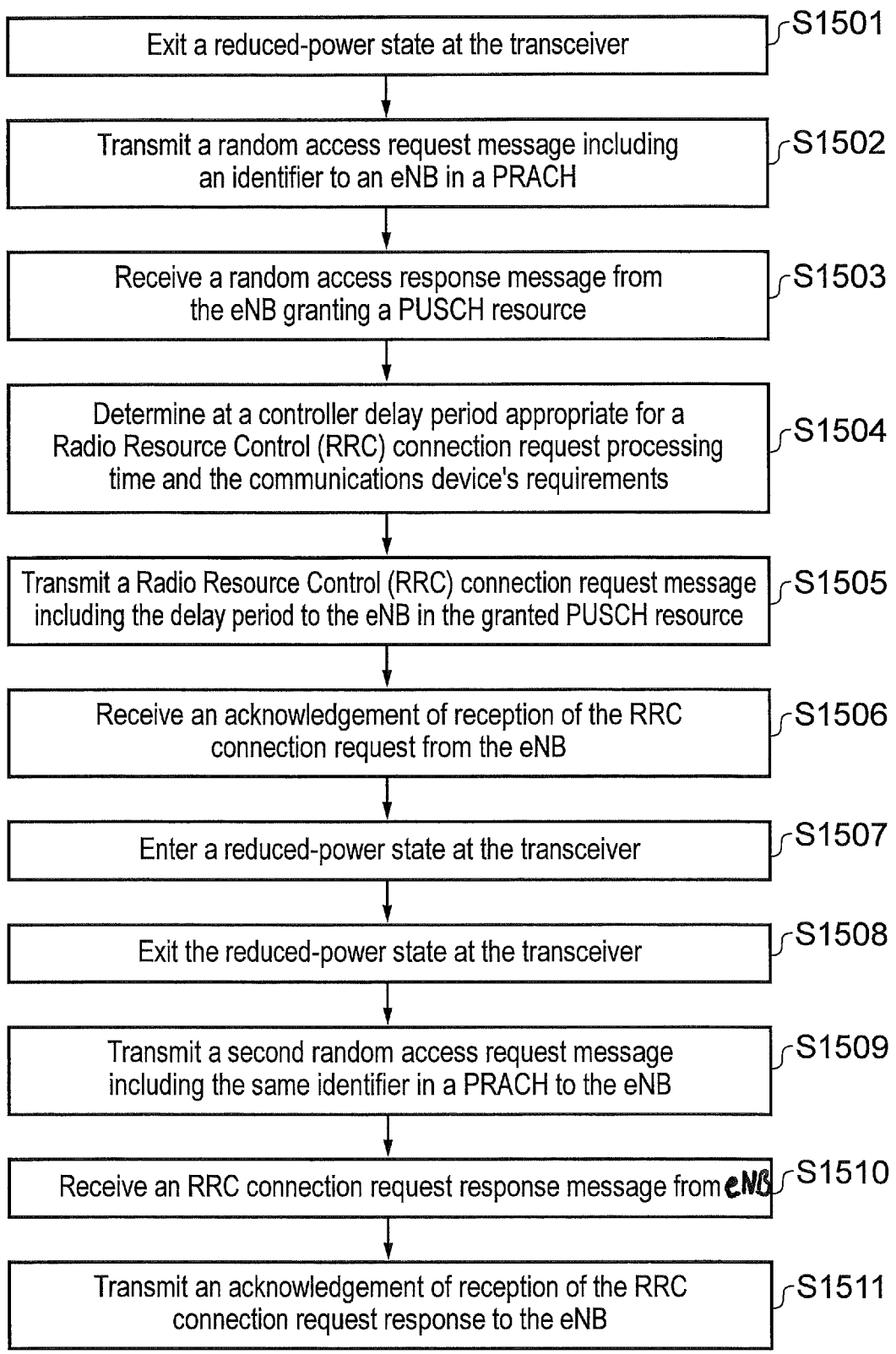
FIG. 15 provides a flow diagram of operations at a communications device operating in accordance with the procedure illustrated in FIG. 14.

The procedure illustrated in FIG. 14 is described by the flow diagram of FIG. 15, where the steps are those taken at the communications device in an LTE system.

S1501: Exit a reduced-power state at the transceiver.

S1502: Transmit a random access request message including an identifier to an eNB in a PRACH.

S1503: Receive a random access response from the eNB granting a PUSCH resource.

S1504: Determine at a controller a delay period appropriate for a Radio Resource Control (RRC) connection request processing time and the communications device's requirements.

S1505: Transmit a Radio Resource Control (RRC) connection request including the delay period to the eNB in the granted PUSCH resource.

S1506: Receive an acknowledgment of reception of the RRC connection request from the eNB.

S1507: Enter a reduced-power state at the transceiver.

S1508: Exit the reduced-power state at the transceiver.

S1509: Transmit a second random access request including the same identifier in a PRACH to the eNB.

S1510: Receive an RRC connection request response message from the eNB.

S1511: Transmit an acknowledgement of reception of the RRC connection request response to the eNB.

Figure 16:
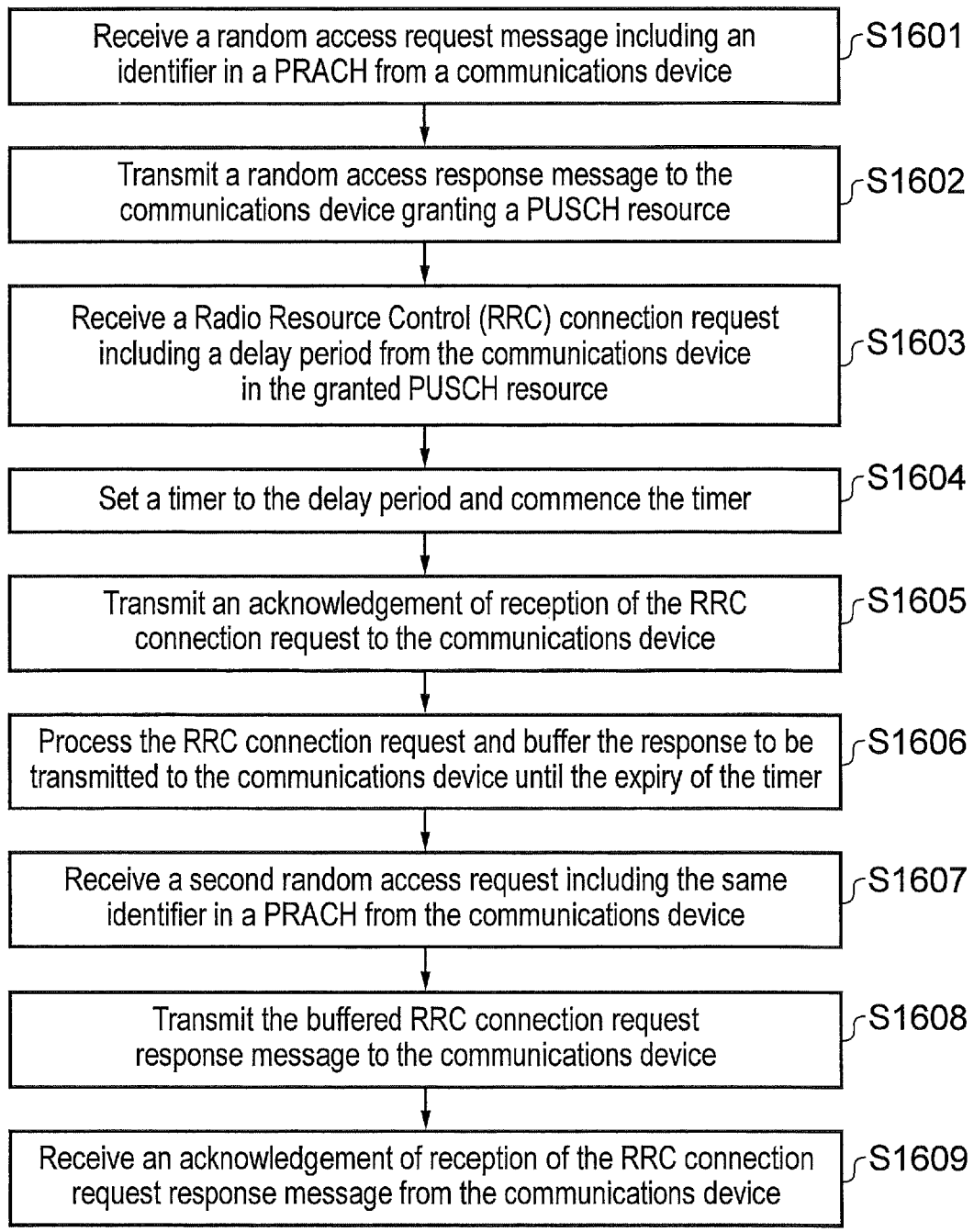
FIG. 16 provides a flow diagram of operations at a base station operating in accordance with the procedure illustrated in FIG. 14.

The procedure illustrated in FIG. 14 is described by the flow diagram of FIG. 16, where the steps are those taken at the base station of an LTE system.

S1601: Receive a random access request message including an identifier in a PRACH from a communications device.

S1602: Transmit a random access response message to the communications device granting a PUSCH resource.

S1603: Receive a Radio Resource Control (RRC) connection request including a delay period from the communications device in the granted PUSCH resource.

S1604: Set a timer to the delay period and commence the timer.

S1605: Transmit an acknowledgement of reception of the RRC connection request to the communications device.

S1606: Process the RRC connection request and buffer the response message to be transmitted to the communications device until the expiry of the timer or transmission of the response.

S1607: Receive a second random access request in a PRACH from the communications device including the same identifier.

S1608: Transmit the buffered RRC connection response message to the communications device.

S1609: Receive an acknowledgement of reception of the RRC connection request response from the communications device.

As previously mentioned, although the procedures above have been described with reference to an LTE system they may be applied to a wide range of systems where the request are transmitted and a response to the request may not be transmitted immediately because of the processing time associated with the request. Accordingly, although FIGS. 14 to 16 a preamble including an identifier for a random access request is used to initiate the transmission of the buffered response, any value or feature which is able to identify the requesting communications device may be used to initiate the transmission of the response to the request. For instance, the actual identity of the communications device may be used. Furthermore, the steps set out in FIGS. 15 and 16 maybe adapted by the addition and removal of steps previously described, such as the commencement of a timer at the communications device at Step 1505 upon which transmission of the second random access request is dependent, delay period compensation at the eNB, and removal of the acknowledgment steps.

Figure 17:
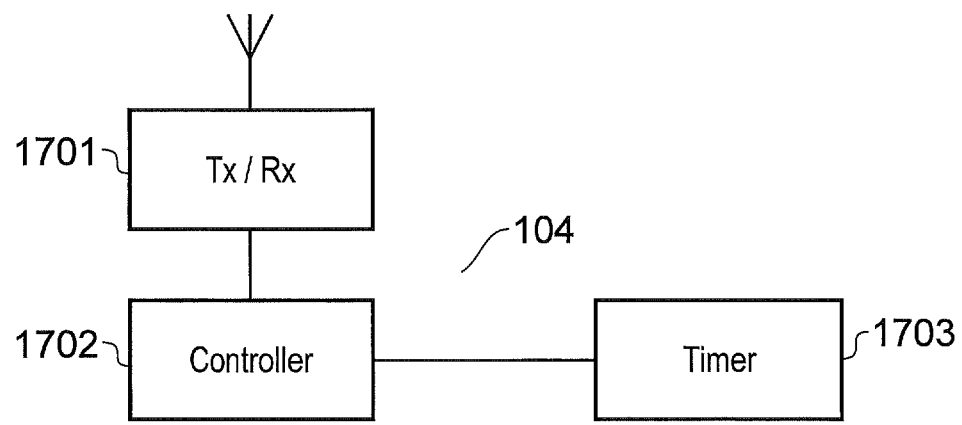
FIG. 17 provides a schematic diagram of a communication device configured to operate in the network of FIG. 1 and in accordance with example embodiments of the present disclosure.

FIG. 17 provides a schematic diagram of a communications device which may operate in accordance with the hereinbefore described embodiments. The communications device 104 includes a transceiver 1701 operable to transmit and to receive data from a base station where the transceiver is controlled by a controller 1702 and may be configured or controlled by the controller to transmit messages and enter and exit a reduced power state as set out in the procedures described above. The communications device may also comprise a timer which may be initiated with a delay period and record the elapsed time from a point defined by the controller and/or count down a time period from a point defined by the controller. For example, the controller may configure the timer to record the elapsed time since the transmission of a request by the transceiver and compare this with a specified delay period.

Figure 18:
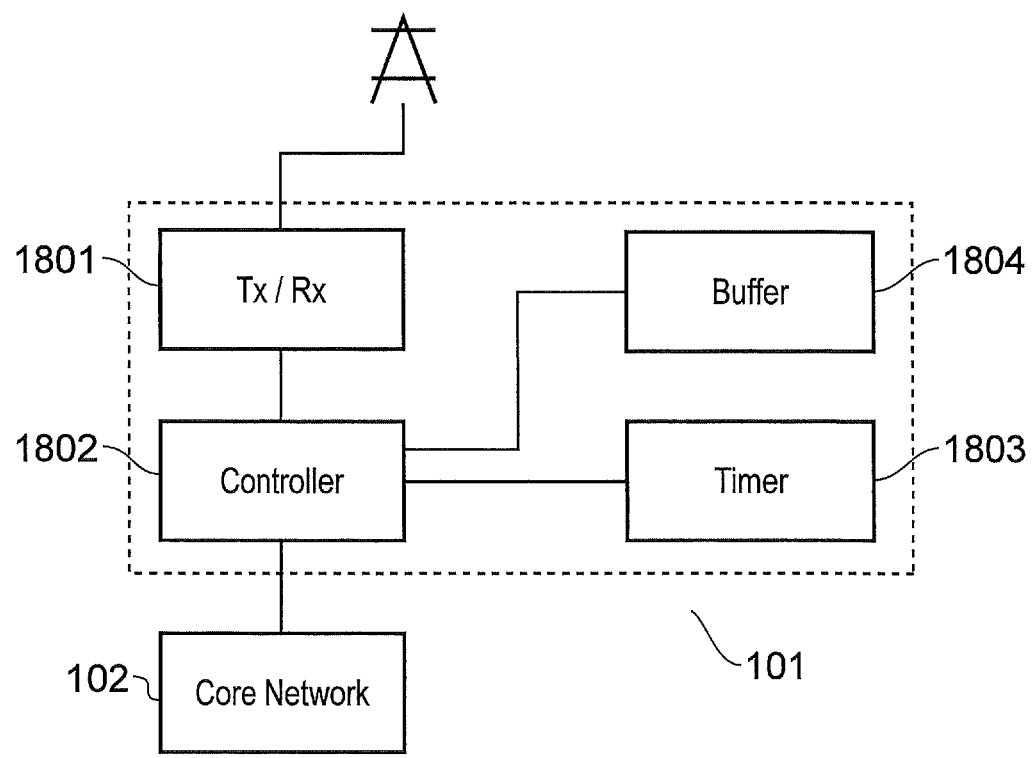
FIG. 18 provides a schematic diagram of a base station configured to operate in the network of FIG. 1 and in accordance with example embodiments of the present disclosure.

FIG. 18 provides a schematic diagram of a base station or infrastructure equipment which may operate in accordance with the hereinbefore described embodiments. The base station 101 includes a transceiver 1801 operable to transmit and to receive data from a plurality of communications devices where the transceiver is controlled by a controller 1802. The base station also comprises a timer 1803 which may be initiated with a delay period received in data received by the transceiver and record the elapsed time from a point defined by the controller and count down a time period from a point defined by the controller. For example, the controller may configure the timer to record the elapsed time since the reception of a request by the transceiver and compare this with a specified delay period. The base station also includes a buffer which may be configured to store messages which are to be transmitted. For example, the buffer may store a response to a request for services received from a communications device and be emptied when a delay timer delay period expires the stored response is successfully transmitted. The controller may process received requests and also coordinate communications between the base station and the core network 102, for instance coordinating the communications of a request received by the base station to the core network.

In some examples in accordance with embodiments of the present disclosure a communications device for transmitting and receiving data to and from infrastructure equipment forming part of a communications network is provided. The communications device comprises a controller and a transceiver configured to transmit and/or receive signals representing the data to and/or from the infrastructure equipment. The transceiver is configured under the control of the controller to transmit a request for services message to the infrastructure equipment, and to receive a response message to the request for services message from the infrastructure equipment. The request for services message includes a delay period, and the controller is configured after transmission of the request for services message to configure the transceiver to enter a reduced power state in which an amount of power consumed by the transceiver is reduced for the delay period. The controller is also configured, after the delay period has expired, to configure the transceiver to exit the reduced power state in order to receive the response message from the infrastructure equipment.

Including a delay period in a request for services message from a communications device to infrastructure equipment in a communications network allows the communications device to have more accurate knowledge of when a response to the request will be transmitted by the infrastructure equipment. As a result of this knowledge the transceiver of the communications device is able to enter a reduced-power state for a period of time and exit the reduced power mode prior to the transmission of the a response to the request without possibility that it may not receive the response when the response is transmitted. This therefore allows the communications device to reduce power consumption whilst still receiving the response. This approach may also be beneficial when the processing of a request at infrastructure equipment takes a minimum period of time. For example if it is known that a response may not be transmitted before the end of this minimum processing it may be more energy efficient to configure the transceiver to enter a reduced power sate for at least the minimum processing period so that the transceiver does not attempt to receive the response before it can possibly be transmitted.

Various aspects and features of the present technique are defined in the following numbered clauses:

1. A communications system comprising infrastructure equipment arranged to provide a wireless interface to a communications device, the communications device comprising a controller and a transceiver configured to transmit and/or receive signals representing the data to and/or from the infrastructure equipment over the wireless interface, and the transceiver under control of the controller is configured to transmit a request for services message to the infrastructure equipment, and to receive a response message to the request for services message transmitted from the infrastructure equipment, wherein the request for services message includes a delay period and the infrastructure equipment, in response to receiving the request for services message, processes the request to form the response message and stores the response message for transmission to the communications device, the response message being stored until the expiry of the delay period or transmission of the response message, and the controller is configured after transmission of the request for services to configure the transceiver to enter a reduced power state in which the amount of power consumed by the transceiver is reduced and to exit the reduced power state to receive the response message.

2. A communications system according to clause 1, wherein the controller is configured to control the transceiver to transmit a random access request message to the infrastructure equipment requesting up-link communications resources for transmitting the request for services message and the infrastructure equipment is configured to transmit a random access request response to the communications device granting up-link communications resources in response to receiving the random access request, and the communications device is configured to transmit the request for services message in the allocated up-link communications resources to the infrastructure equipment.

3. A communications system according to clause 2, wherein the controller is configured to control the transceiver prior to the expiry of the delay period to transmit a second random access request message to the infrastructure equipment requesting up-link communications resources for transmitting a request for a response message to the infrastructure equipment, the request for a response message requesting a response to the request for services message, and in response to a granting of the up-link communications resources from the infrastructure equipment, to transmit the request for response message in the allocated up-link communications resources to the infrastructure equipment, and to receive a response message from the infrastructure equipment providing the requested services to the communications device in response to the request for services message, and the infrastructure equipment is configured to transmit a random access request response to the communications device granting up-link communications resources in response to receiving the second random access request from the transceiver, to receive the request for a response message requesting a response to the request for services message, and to transmit a response message to the communications device providing the requested services to the communications device in response to the request for services message.

4. A communications system according to clause 2, wherein the controller is configured to control the transceiver to exit the reduced power state to receive the response message in response to the expiry of the delay period, and the infrastructure equipment is configured to transmit the response message to the transceiver in response to the expiry of the delay period.

5. A communications system according to clause 2, wherein the random access request message transmitted by the transceiver to the infrastructure equipment requesting up-link communications resources includes an identifier identifying the communications device which has transmitted the random access request message and the transceiver is configured to receive a random access response message from the infrastructure equipment which provides the granted up-link communications resources for transmitting the request for services message, the random access response including the identification number, and prior to the expiry of the delay period the transceiver is configured to transmit a second random access request message, which includes the identification number to the infrastructure equipment, and to receive in response to the second random access request message a response message from the infrastructure equipment providing the requested services to the communications device in response to the request for services message; and the infrastructure equipment is configured to transmit a random access response message providing the granted up-link communications resources for the transceiver to transmit the request for services message to the infrastructure equipment, to receive the second random access request message from the communications device, and to transmit, in response to the second random access request message, a response message providing the requested services to the communications device in response to the request for services message.

6. A communications system according to any of the preceding clauses, wherein the request for services message represents a request for a radio resources connection request to the communications network to establish a radio communications bearer for transmitting data to and/or from the communications network.

7. A communications system according to any of the preceding clauses, wherein the infrastructure equipment transmits an indication of the delay period and the controller is configured with the transceiver unit to receive the indication of the delay period from the communications network and to store the indication in data store.

8. A communications system according to any of the preceding clauses, wherein the delay period exceeds the time taken to process the request for services message and form the response message at the infrastructure equipment.

9. The communications system according to any of the preceding clauses, wherein the communications network is a 3GPP LTE mobile network and the request for services message is a Radio Resource Control request and the response to the request for services message is a Radio Resource Control Setup response.

10. Infrastructure equipment arranged to provide a wireless interface to a communications device forming part a communications network, the infrastructure equipment configured to transmit and/or receive signals representing data to and/or from the communications device over the wireless interface, and the infrastructure equipment is configured to receive a request for services message from the communications device, to transmit a response message to the request for services message to the communications device, wherein the request for services includes a delay period and the infrastructure equipment, in response to receiving the request for services message, processes the request to form the response message and stores the response message for transmission to the communications device, the response message being stored until expiry of the delay period or transmission of the response message.

11. Infrastructure equipment according to clause 10, wherein the infrastructure is configured to receive a random access request message from the communications device requesting up-link communications resources for transmitting the request for services message, to transmit a random access request response to the communications device granting up-link communications resources in response to receiving the random access request message, and to receive the request for services message in the granted up-link resources from the communications device.

12. Infrastructure equipment according to clause 11, wherein the infrastructure equipment is configured to store the response to the request for services until the expiry of the delay period or transmission of the response message, to receive a second random access request message requesting uplink communications resources for transmitting a request for a response message from the communications device, to transmit a random access request response to the communications device granting up-link communications resources in response to receiving the second random access request message from the communications device, to receive the request for a response message requesting a response to the request for services message, and to transmit the response message to the communications device providing the requested services to the communications device in response to the request for services message.

13. Infrastructure equipment according to clause 10 or 11, wherein the infrastructure equipment is configured to transmit the response message to the communications device in response to the expiry of the delay period.

14. Infrastructure equipment according to clause 12, wherein the random access request message transmitted by the communications device to the infrastructure equipment requesting up-link communications resources includes an identifier identifying the communications device which has transmitted the random access request message and the infrastructure equipment is configured to transmit a random access response message to the communications device which provides the granted up-link communications resources for transmitting the request for services message, the random access response including the identification number to receive a second random access request message from the communications device, which includes the identification number, to transmits in response to the second random access request message a response message to the communications device providing the requested services to the communications device in response to the request for services message.

15. Infrastructure equipment according to any of clauses 10 to 14, wherein the request for services message represents a request for a radio resources connection request to the communications network to establish a radio communications bearer for transmitting data to and/or from the communications network.

16. Infrastructure equipment according to any of clauses 10 to 15, wherein the delay period exceeds the time taken to process the request for services message at the infrastructure equipment.

17. Infrastructure equipment according to any of clauses 10 to 16, wherein the communications network is a 3GPP LTE mobile network and the request for services message is a Radio Resource Control request and the response to the request for services message is a Radio Resource Control Setup response.

18. A method for transmitting and receiving signals representing data to and/or from infrastructure equipment forming part of a communications network to and/or from a communications device, the method comprising receiving a request for services from the communications device, transmitting a response message to the request for services to the communications device, wherein the request for services message includes a delay period and the infrastructure equipment, in response to receiving the request for services, processing the request for services and storing the response message for transmission to the communications device, the response message being stored until the expiry of the delay period or transmission of the response message, and the controller is configured after transmission of the request for services to configure the transceiver to enter a reduced power state in which the amount of power consumed by the transceiver is reduced and to exit the reduced power state to receive the response message.

The invention claimed is:

1. A communications system comprising infrastructure equipment arranged to provide a wireless interface to a communications device, the communications device comprising a controller and a transceiver configured to transmit and/or receive signals representing the data to and/or from the infrastructure equipment over the wireless interface, and the transceiver under control of the controller is configured to:
- transmit a first random access request message to the infrastructure equipment requesting up-link communications resources for transmitting a radio resource control (RRC) connection request,
- receive, from the infrastructure equipment, a random access request response to the communications device granting up-link communications resources in response to receiving the first random access request,
- transmit the RRC connection request to the infrastructure equipment in the allocated up-link communications resources to the infrastructure equipment,
- receive a response message to the RRC connection request transmitted from the infrastructure equipment, wherein the RRC connection request includes a delay period and the infrastructure equipment, in response to receiving the RRC connection request, processes the RRC connection request to form the response message and stores the response message for transmission to the communications device, the response message being stored until the expiry of the delay period or transmission of the response message, and the controller is configured after transmission of the RRC connection request to configure the transceiver to enter a reduced power state in which the amount of power consumed by the transceiver is reduced and to exit the reduced power state to receive the response message;
- transmit a second random access request message to the infrastructure equipment requesting up-link communications resources for transmitting a request for a response message to the infrastructure equipment, the request for a response message requesting a response to the RRC connection request, and
- in response to a granting of the up-link communications resources from the infrastructure equipment, transmit the request for response message in the allocated up-link communications resources to the infrastructure equipment, and receive a response message from the infrastructure equipment providing the requested services to the communications device in response to the RRC connection request.

2. A communications system as claimed in claim 1, wherein
the infrastructure equipment is configured
- to transmit a random access request response to the communications device granting up-link communications resources in response to receiving the second random access request from the transceiver,
- to receive the request for a response message requesting a response to the RRC connection request, and
- to transmit a response message to the communications device providing the requested services to the communications device in response to the RRC connection request.

3. A communications system as claimed in claim 1, wherein the controller is configured to control the transceiver to exit the reduced power state to receive the response message in response to the expiry of the delay period, and the infrastructure equipment is configured to transmit the response message to the transceiver in response to the expiry of the delay period.

4. A communications system as claimed in claim 1, wherein the first random access request message transmitted by the transceiver to the infrastructure equipment requesting up-link communications resources includes an identifier identifying the communications device which has transmitted the first random access request message and the transceiver is configured
- to receive the random access response message from the infrastructure equipment which provides the granted up-link communications resources for transmitting the RRC connection request, the random access response including the identification number, and prior to the expiry of the delay period the transceiver is configured
- to transmit the second random access request message, which includes the identification number to the infrastructure equipment, and
- to receive in response to the second random access request message the response message from the infrastructure equipment providing the requested services to the communications device in response to the RRC connection request; and the infrastructure equipment is configured
- to transmit a random access response message providing the granted up-link communications resources for the transceiver to transmit the RRC connection request to the infrastructure equipment,
- to receive the second random access request message from the communications device, and
- to transmit, in response to the second random access request message, the response message providing the requested services to the communications device in response to the RRC connection request.

5. A communications system as claimed in claim 1, wherein the RRC connection request represents a request for a radio resources connection request to the communications network to establish a radio communications bearer for transmitting data to and/or from the communications network.

6. A communications system as claimed in claim 1, wherein the infrastructure equipment transmits an indication of the delay period and the controller is configured with the transceiver unit to receive the indication of the delay period from the communications network and to store the indication in data store.

7. A communications system as claimed in claim 1, wherein the delay period exceeds the time taken to process the RRC connection request and form the response message at the infrastructure equipment.

8. The communications system as claimed in claim 1, wherein the communications network is a 3GPP LTE mobile network and the response to the RRC connection request is a Radio Resource Control Setup response.

9. Infrastructure equipment arranged to provide a wireless interface to a communications device forming part a communications network, the infrastructure equipment configured to transmit and/or receive signals representing data to and/or from the communications device over the wireless interface, and the infrastructure equipment comprising:
circuitry configured to
- receive a first random access request message from the communications device requesting up-link communications resources for transmitting a radio resource connection (RRC) request;
- transmit a random access request response to the communications device granting up-link communications resources in response to receiving the first random access request message;
- receive the connection request from the communications device in the granted up-link resources;

transmit a response message to the RRC connection request to the communications device, wherein the RRC connection request includes a delay period;

in response to receiving the RRC connection request, processes the RRC connection request to form the response message;

store the response message for transmission to the communications device, the response message being stored until expiry of the delay period or transmission of the response message;

receive a second random access request message requesting uplink communications resources for transmitting a request for a response message from the communications device;

transmit a random access request response to the communications device granting up-link communications resources in response to receiving the second random access request message from the communications device;

receive the request for a response message requesting a response to the RRC connection request; and transmit the response message to the communications device providing the requested services to the communications device in response to the RRC connection request.

10. Infrastructure equipment as claimed in claim 9, wherein the circuitry is configured to transmit the response message to the communications device in response to the expiry of the delay period.

11. Infrastructure equipment as claimed in claim 9, wherein the first random access request message transmitted by the communications device to the infrastructure equipment requesting up-link communications resources includes an identifier identifying the communications device which has transmitted the first random access request message and the circuitry is configured to:

transmit the random access response message to the communications device which provides the granted up-link communications resources for transmitting the RRC connection request, the random access response including the identification number;

receive the second random access request message from the communications device, which includes the identification number; and transmit in response to the second random access request message, the response message to the communications device providing the requested services to the communications device in response to the RRC connection request.

12. Infrastructure equipment as claimed in claim 9, wherein the RRC connection request represents a request for a radio resources connection request to the communications network to establish a radio communications bearer for transmitting data to and/or from the communications network.

13. Infrastructure equipment as claimed in claim 9, wherein the delay period exceeds the time taken to process the RRC connection request at the infrastructure equipment.

14. Infrastructure equipment as claimed in claim 9, wherein the communications network is a 3GPP LTE mobile network and the response to the RRC connection request is a Radio Resource Control Setup response.

15. A communication device configured to communicate with infrastructure equipment arranged to provide a wireless interface to the communications device, the communications device comprising:

circuitry configured to transmit a first random access request message to the infrastructure equipment requesting up-link communications resources for transmitting a radio resource control (RRC) connection request, receive, from the infrastructure equipment, a random access request response to the communications device granting up-link communications resources in response to receiving the first random access request, transmit the RRC connection request to the infrastructure equipment in the allocated up-link communications resources to the infrastructure equipment, receive a response message to the RRC connection request transmitted from the infrastructure equipment, wherein the RRC connection request includes a delay period and the infrastructure equipment, in response to receiving the RRC connection request, processes the RRC connection request to form the response message and stores the response message for transmission to the communications device, the response message being stored until the expiry of the delay period or transmission of the response message;

configure, after transmission of the RRC connection request, the transceiver to enter a reduced power state in which the amount of power consumed by the transceiver is reduced and to exit the reduced power state to receive the response message;

transmit a second random access request message to the infrastructure equipment requesting up-link communications resources for transmitting a request for a response message to the infrastructure equipment, the request for a response message requesting a response to the RRC connection request; and in response to a granting of the up-link communications resources from the infrastructure equipment, transmit the request for response message in the allocated up-link communications resources to the infrastructure equipment, and receive a response message from the infrastructure equipment providing the requested services to the communications device in response to the RRC connection request.

* * * * *